(12) United States Patent  (10) Patent No.: US 9,033,244 B2
Matsuda et al.  (45) Date of Patent: *May 19, 2015

(54) EXTERNAL ILLUMINATION APPARATUS FOR OPTICAL INFORMATION READING APPARATUS

(71) Applicant: Keyence Corporation, Osaka (JP)

(72) Inventors: Hajime Matsuda, Osaka (JP); Tomomi Izaki, Osaka (JP); Daisuke Matsumoto, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,014

(22) Filed: Oct. 25, 2013

(65) Prior Publication Data

US 2014/0048603 A1 Feb. 20, 2014

Related U.S. Application Data

(63) Continuation of application No. 13/205,734, filed on Aug. 9, 2011, now Pat. No. 8,714,455.

(30) Foreign Application Priority Data

Sep. 17, 2010 (JP) ................................ 2010-210251

(51) Int. Cl.
*G06K 7/10* (2006.01)
*H05B 33/08* (2006.01)

(52) U.S. Cl.
CPC ........ *G06K 7/10732* (2013.01); *H05B 33/0803* (2013.01); *H05B 33/0806* (2013.01)

(58) Field of Classification Search
CPC .......... G06K 7/10732; G06K 7/10702; G06K 7/10574
USPC ..................................................... 235/462.42
See application file for complete search history.

(56) References Cited

U.S. PATENT DOCUMENTS

| 7,360,705 B2 * | 4/2008 | Heinrich ................. 235/462.06 |
| 8,556,180 B2 * | 10/2013 | Liou ....................... 235/462.42 |
| 2012/0068629 A1 | 3/2012 | Matsuda et al. |

FOREIGN PATENT DOCUMENTS

| JP | 11-338966 | 12/1999 |
| JP | 2008-033465 | 2/2008 |
| JP | 2008-059194 | 3/2008 |
| JP | 2011-076517 | 4/2011 |
| JP | 2011-076519 | 4/2011 |

* cited by examiner

*Primary Examiner* — Jamara Franklin
(74) *Attorney, Agent, or Firm* — Kilyk & Bowersox, P.L.L.C.

(57) ABSTRACT

There is provided an external illumination apparatus capable of increasing flexibility of illumination, the external illumination apparatus including a CPU and a memory so as to control lighting of a plurality of illumination LEDs with reference to a lighting pattern stored in the memory, wherein this lighting control is executed by a lighting command from an optical information reading apparatus.

8 Claims, 28 Drawing Sheets

(INTERNAL ILLUMINATION: 5)

(LARGE-DIAMETER EXTERNAL ILLUMINATION: 4B)

(SMALL-DIAMETER EXTERNAL ILLUMINATION: 4A)

EXTERNAL ILLUMINATION APPARATUS FOR OPTICAL INFORMATION READING APPARATUS

CROSS-REFERENCE TO RELATED APPLICATIONS

The present application is a continuation of U.S. patent application Ser. No. 13/205,734, filed Aug. 9, 2011, and which claims foreign priority based on Japanese Patent Application No. 2010-210251, filed Sep. 17, 2010, the contents of which is incorporated herein by reference.

BACKGROUND OF THE INVENTION

1. Field of the Invention

The present invention relates to an illumination apparatus used in an optical information reading apparatus for reading optical information such as a bar code and a QR code.

2. Description of the Related Art

Now that traceability is widespread, an optical information reading apparatus is installed in a factory, a physical distribution complex and the like to decode optical information such as a bar code or an optical code given to a product or a commodity. This type of optical information reading apparatus is called a "bar code reader" or a "code reader".

The bar code reader irradiates the optical information with laser light, visible light or infrared light to take in reflected light by an optical reading element (image pickup element). Analysis of information recorded in the optical information is performed from the picked-up image that has been taken in.

The bar code reader includes illumination LEDs as described in Japanese Unexamined Patent Publication No. 2008-33465, and takes in the optical information while illuminating a visual field range with these illumination LEDs. In the case where it is difficult to read the optical information by internal illumination of the bar code reader in some surface textures and work environments of a work, external illumination separate from the bar code reader is used (Japanese Unexamined Patent Publication No. H11-338966).

Although it is generally considered that the bar code reader controls the external illumination, the use of the external illumination does not solve all problems, and delicate control over lighting timing, how to throw light in the external illumination, light intensity and the like is often necessary, which limits the control of the external illumination.

Specifically, it is generally known that capability of the bar code reader to read the optical information largely varies, depending on an irradiation direction of the light to the work. Particularly, when reading the optical information (the bar code or the QR code) directly inscribed on the work, which is called direct part marking, even if the optical information originally has enough inscribing quality to be read, the reading may become unstable, or may be disabled, depending on the direction at which the light is thrown to the work. From this, an external illumination unit capable of partial illumination, which can change a lighting portion of a plurality of illumination LEDs has been launched. Such an external illumination unit is connected to the bar code reader, and upon receiving a lighting command from this bar code reader, the external illumination unit lights up.

A usage environment of the bar code reader varies depending on the user, and development of the bar code reader has been carried out with this in mind. In the case where the external illumination unit is used, if the external illumination unit can perform illumination in as various lighting patterns as possible, stable reading can be realized to the work requiring fine reading, such as the work subjected to the above-described direct part marking.

However, in order to realize the various lighting patterns, partial illumination areas in which the illumination LEDs of the external illumination unit can be arbitrarily controlled so as to be lighted and lighted out need to be increased, and thus, in order to control the lighting and the lighting-out on the basis of each of the increased partial illumination areas, a control line corresponding to each of the areas needs to be prepared. This leads to complication of the control, and wiring connecting the bar code reader and the external illumination unit becomes very complicated.

Obviously, when followability of speeding-up of a production line of a factory where the bar code reader is installed, and an applicable range of the bar code reader are intended to be increased, enhancement in flexibility and responsiveness of the control of the external illumination is sought.

SUMMARY OF THE INVENTION

An object of the present invention is to provide an external illumination unit capable of realizing various lighting patterns of the external illumination unit while simplifying wiring with an optical information reading apparatus.

Another object of the present invention is to provide an external illumination unit capable of enhancing responsiveness of control of external illumination to thereby increase reading accuracy of the optical information reading apparatus.

According to the present invention, the above-described technical object can be achieved by providing an external illumination apparatus for an optical information reading apparatus, which is used together with the optical information reading apparatus having a communication function with external equipment, the external illumination apparatus including: a plurality of illumination LEDs; a switching device that switches lighting and lighting-out on a basis of each area resulting from dividing the plurality of illumination LEDs into a predetermined plurality of areas; a memory storing a lighting pattern defining the area to be lighted; a control device that controls the switching device so as to light the illumination LEDs in the area corresponding to the lighting pattern, with reference to the lighting pattern stored in the memory; and an LED driving device that lights the illumination LEDs permitted to be lighted by the control device, upon receiving an external lighting command trigger.

Referring to FIG. 44, one specific configuration of the present invention is an external illumination apparatus 208 used together with an optical information reading apparatus 206 having a communication function 204 with external equipment, the external illumination apparatus including:

a plurality of illumination LEDs 210;

a processor 214 as a control device that controls lighting of the illumination LEDs 210 through communication 212 with the optical information reading apparatus 206;

a memory 216 storing a lighting pattern of the illumination LEDs 210; and an LED driver 218 that drives the illumination LEDs 210, wherein when a lighting command trigger from the optical information reading apparatus 206 is received, the lighting of the plurality of illumination LEDs 210 is controlled with reference to the lighting pattern stored in the memory 216 of the external illumination apparatus 208.

A common lighting pattern is stored in the memory 216 of the external illumination apparatus 208 and a memory 202 of the optical information reading apparatus 206. This lighting pattern is set by the user in advance. In the memory 216 of the external illumination apparatus 208 and the memory 202 of the optical information reading apparatus 206, model information of the external illumination apparatus 208 is preferably stored, by which setting work when the external illumination apparatus 208 is connected to the optical information reading apparatus 206 can be automatized.

Preparing a plurality of lighting patterns as the lighting pattern enables the illumination of the external illumination apparatus 208 to be controlled in the plurality of lighting patterns.

According to the present invention, since the external illumination apparatus 208 includes the processor 214 as the control device that controls the lighting of the illumination LEDs 210 by the communication 212 with the optical information reading apparatus 206, and the memory 216 storing the lighting pattern of the illumination LEDs 210, the lighting of the plurality of illumination LEDs 210 can be controlled by receiving the lighting command from the optical information reading apparatus 206. Accordingly, the illumination of the external illumination apparatus 208 can be controlled under high responsiveness. Moreover, preparing the plurality of lighting patterns enables the illumination of various aspects. Other objects, and operation and effects in the present invention will be clear from detailed description of an embodiment below.

DETAILED DESCRIPTION OF THE PREFERRED EMBODIMENT

Embodiment

Figure 1:
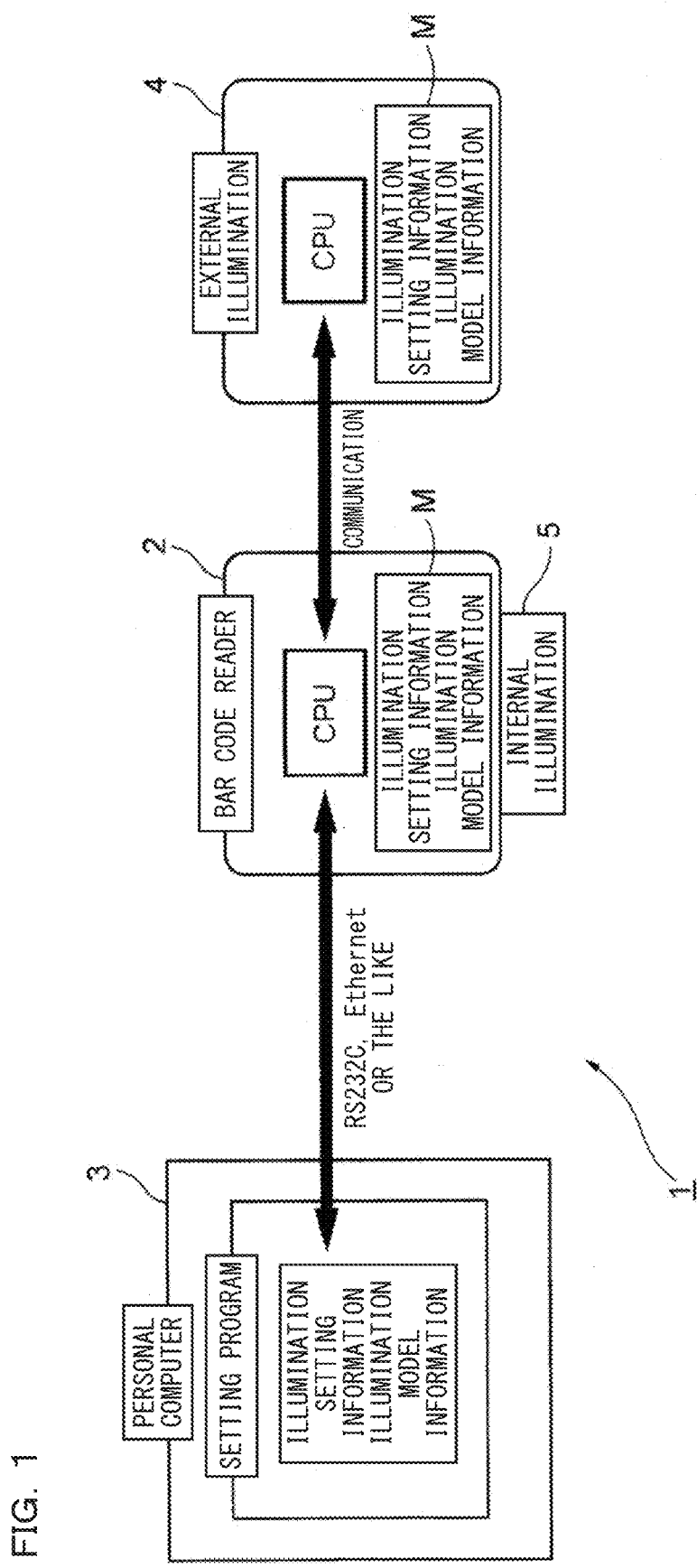
FIG. 1 is an overall configuration diagram of a bar code reader system.

Hereinafter, a preferred embodiment of the present invention will be described based on the accompanying drawings.
Bar Code Reader System (FIG. 1):

FIG. 1 is a diagram for describing an outline of a bar code reader system. Referring to FIG. 1, a bar code reader system 1 has a bar code reader 2, which is a two-dimensional information reading apparatus, and a personal computer 3 connected to the bar code reader 2 as needed, and makes various settings using the personal computer 3 while checking, on the personal computer 3, an image picked up by the bar code reader 2. In the bar code reader system 1, a ring-type external illumination unit 4 is further connected to the bar code reader 2 as needed to illuminate a work together with an internal illumination unit 5 of the bar code reader 2, or only by the external illumination unit 4 with operation of the internal illumination unit 5 stopped.

The ring-type external illumination unit 4 is a dedicated member for the bar code reader system 1. It is preferable to prepare a plurality of different types of external illumination units 4. Obviously, an illumination unit other than the dedicated member can be incorporated as the external illumination unit 4. The "optical information reading apparatus" is generally called a "bar code reader" or a "code reader", and herein, an industry term, the "bar code reader" is used.

The bar code reader system 1 is installed in a conveyance path of products or goods in a factory where the products or goods on which optical information or an optical code such as barcode or QR code is printed or inscribed are manufactured, so that information recorded in the optical information printed on the products or goods is read by the bar code reader 2, and this information is transferred to the personal computer 3 to analyze the information.

In an example shown in the figure, as disclosed in FIG. 1, a setting program is installed on the personal computer 3, by which using the personal computer 3, various settings of the bar code reader system 1 are made. Obviously, the bar code reader 2 may be provided, for example, with a display device with a touch panel to enable setting work of the bar code reader 2, the internal illumination unit 5 (FIG. 3), and/or the external illumination unit 4 (FIGS. 20 and 21), using this display device.

Figure 2:
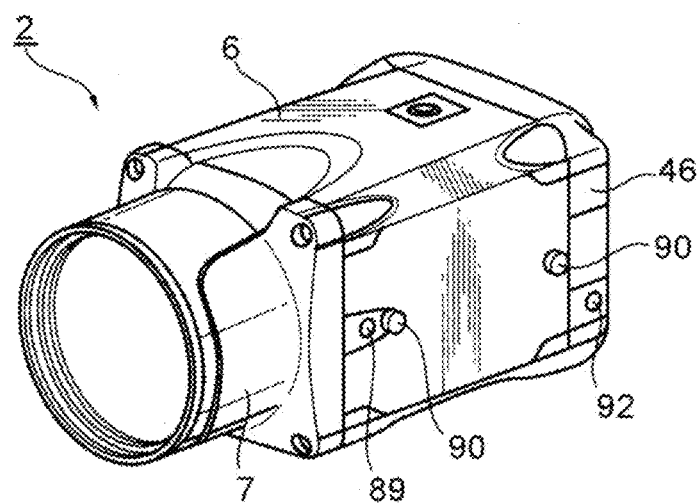
FIG. 2 is a perspective view of a bar code reader, which is an optical information reading apparatus.

Bar Code Reader 2 (FIGS. 2 to 19):

FIG. 2 is a perspective view showing an appearance of the bar code reader 2. The bar code reader 2 has a main case 6 having a polygonal cross-sectional shape, and a cylindrical front case 7 fixed to a front end of the main case 6, and the foregoing internal illumination unit 5 is incorporated in the cylindrical front case 7. The main case 6 preferably has a substantially square cross-sectional shape, as seen from FIG. 2 and the like.

Figure 3:
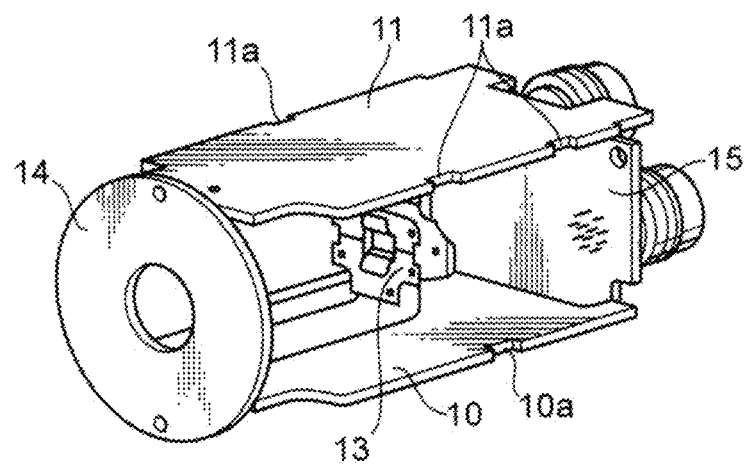
FIG. 3 is a view when arrangement of various types of substrates arranged inside the bar code reader is seen from an obliquely front side.
Figure 4:
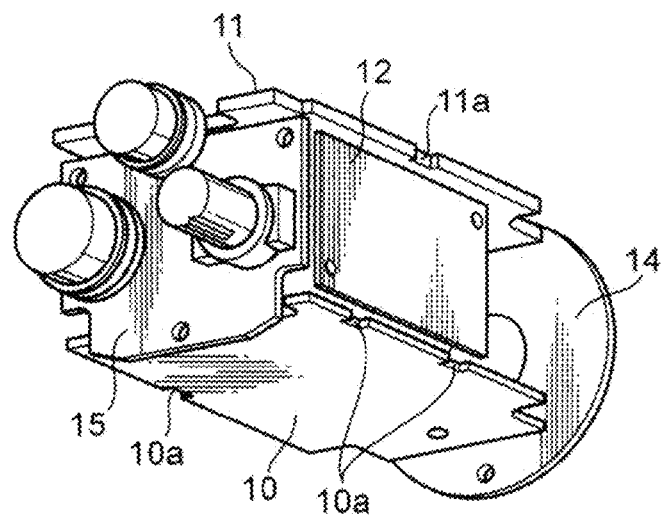
FIG. 4 is a view related to FIG. 3, wherein the arrangement of the various types of substrates arranged inside the bar code reader is seen from an obliquely rear side.
Figure 5:
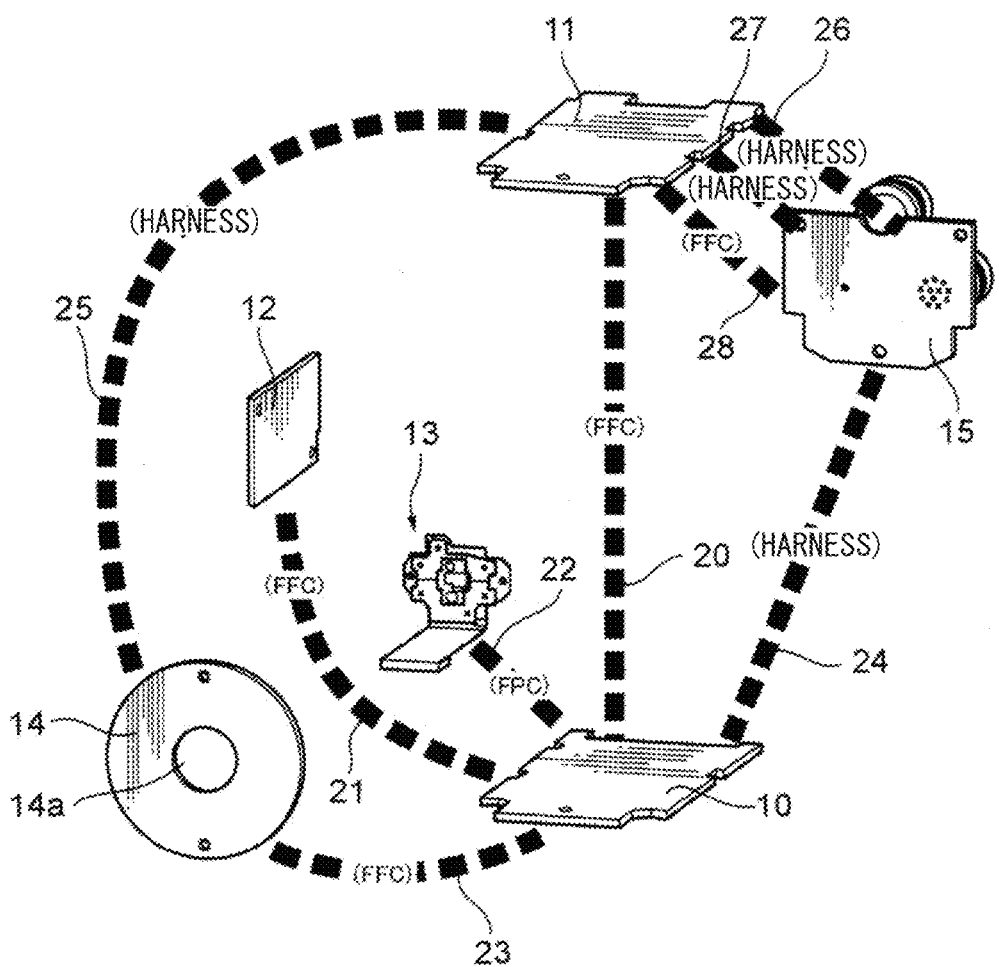
FIG. 5 is a view for describing connection wiring relationships of the various types of substrates incorporated in the bar code reader.

A plurality of substrates independent from one another are incorporated in the bar code reader 2. Referring to FIGS. 3 to 5, the plurality of substrates included in the bar code reader 2 are as follows.

(1) Main Substrate 10:

In a main substrate 10, a CPU and a memory M are mounted to transfer an image to the memory M and process the image in a DSP (Digital Signal Processor). The bar code reader 2 including the internal illumination unit 5 is controlled by the CPU of the main substrate 10, and communication with the external illumination unit 4 is executed.

(2) Power Supply Substrate 11:

A power supply of the bar code reader 2 is generated. An insulated input and output circuit is installed.

(3) Sub Substrate 12:

A large-capacity memory is mounted and an acquired image and various settings are stored in this large-capacity memory. On this substrate, elements that cannot be mounted on the main substrate 10 with a limited size and shape are mounted.

(4) CMOS Substrate 13 (Light-Receiving Substrate):

A CMOS image sensor (optical reading element) is installed, so that the image is acquired and transferred to the main substrate 10. LEDs 40 for pointer (FIG. 10) are mounted.

(5) LED Substrate 14:

An LED substrate 14 is a disc-like substrate with a circular opening 14a making up the internal illumination unit 5. A plurality of illumination LEDs 80 are installed on the LED substrate 14 (FIG. 32 described later), so that lighting control of the illumination LEDs 80 is executed. The plurality of illumination LEDs 80 are arrayed on a plurality of concentric circles with different diameters centering on an optical axis of a later-described lens assembly 36 of the bar code reader 2. The plurality of illumination LEDs 80 installed in the internal illumination unit 5 (in the LED substrate 14) are subjected to the light control by being divided into areas as will be described later. In the LED substrate 14, constant current circuits that supply a constant current to the plurality of illumination LEDs belonging to the respective areas are provided.

(6) Connector Substrate 15:

A connector substrate 15 is a substrate making up an interface of input and output with respect to an external power supply, an 10, an RS232C, Ethernet (registered trademark), and the external illumination unit 4. Power is supplied to the external illumination unit 4 from the power supply substrate 11.

Referring to FIGS. 3 and 4, the main substrate 10 and the power supply substrate 11 are arranged in opposition to each other, and in a region sandwiched by respective side edges of the main substrate 10 and the power supply substrate 11, the sub substrate 12 is provided orthogonally to the main substrate 10 and the power supply substrate 11. An arrangement position of the sub substrate 12 and the main substrate 10 may be exchanged. The main substrate 10, the power supply substrate 11, and the sub substrate 12 are disposed adjacent to three side surfaces of four side surfaces of the main case 6 having a rectangular cross section in the bar code reader 2, and along the respective three side surfaces. The CMOS substrate 13 is located in a space surrounded by the main substrate 10, the power supply substrate 11 and the sub substrate 12, and the CMOS substrate 13 is disposed on one vertical surface orthogonal to the respective substrates 10 to 12. The LED substrate 14 and the connector substrate 15 are positioned parallel to the CMOS substrate 13 so as to be opposed to each other with the CMOS substrate 13 interposed therebetween.

FIG. 5 is a view for describing connection relationships of the substrates 10 to 15. The main substrate 10 is connected to the power supply substrate 11 through a first FFC 20 (Flexible Flat Cable) and to the sub substrate 12 through a second FFC 21, to the CMOS substrate 13 through an FPC (Flexible Printed Circuit) 22, to the LED substrate 14 of the internal illumination unit 5 through a third FFC 23, and to the connector substrate 15 through a first harness 24. The power supply substrate 11 is also connected to the LED substrate 14 of the internal illumination unit 5 through a second harness 25, so that the power supply to cause the illumination LEDs installed in the LED substrate 14 to emit light is supplied from the power supply substrate 11 to the LED substrate 14. The power supply substrate 11 and the connector substrate 15 are connected through two harnesses 26, 27 and an FFC 28.

Referring again to FIG. 5, it should be noted that the main substrate 10 and the power supply substrate 11 have substantially the same size and shape. In other words, the main substrate 10 is designed to have substantially the same size and shape as the power supply substrate 11, and electronic components that cannot be mounted on the main substrate 10 because of these limitations are mounted on the sub substrate 12.

Figure 6:
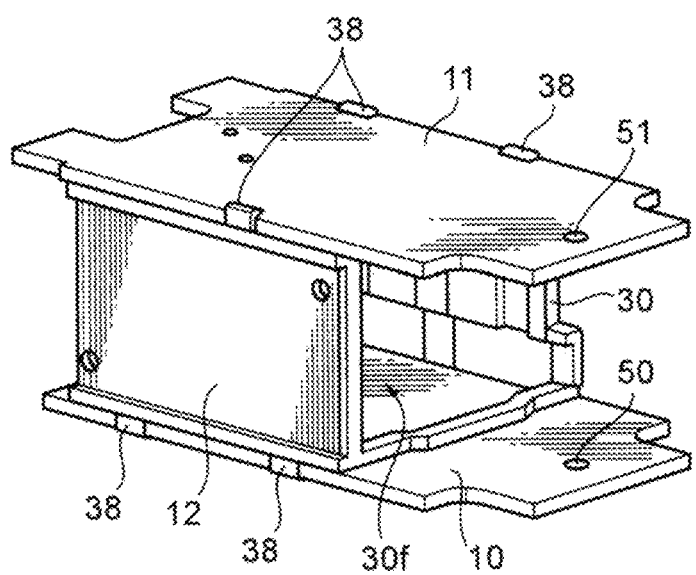
FIG. 6 is a view for describing arrangement of a chassis incorporated in the bar code reader, and a main substrate, a power supply substrate, and a sub substrate assembled to the chassis.
Figure 7:
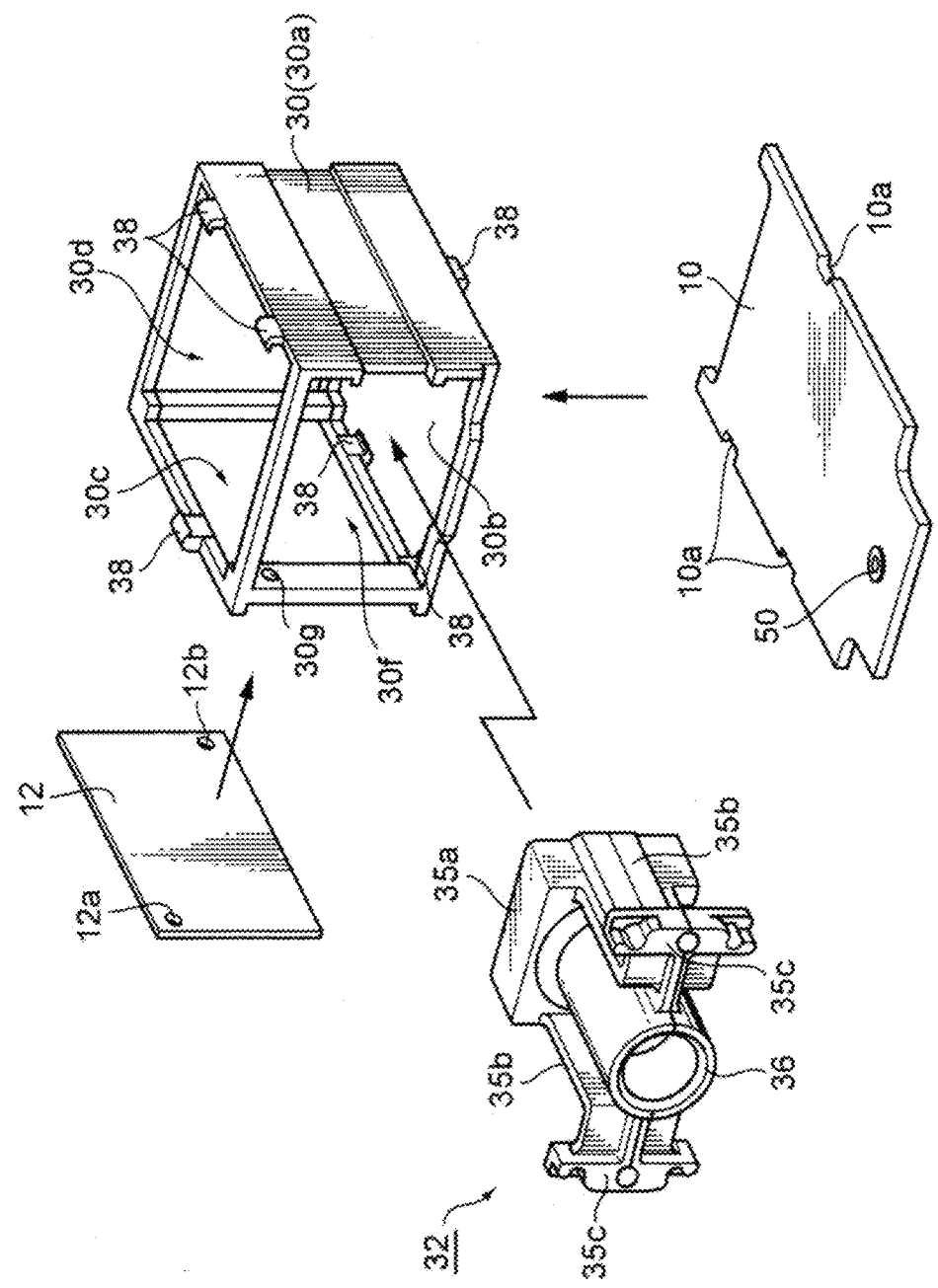
FIG. 7 is a view for describing various elements assembled to the chassis.

Referring to FIGS. 6 and 7, the main substrate 10, the power supply substrate 11, the sub substrate 12, and the CMOS substrate 13 are assembled to a chassis 30, which is a resin molded article. As best seen in FIG. 7, the chassis 30 has a box shape having a substantially square cross-sectional shape, which is an almost similar shape to the cross-sectional shape of the main case 6, and has a form in which one side surface 30a of this box shape is closed and the other five surfaces are open. The main substrate 10, the power supply substrate 11, and the sub substrate 12 are disposed on three open side surfaces 10b to 10d, respectively. The chassis 30 of the resin molded article is open at the front and rear thereof, and a camera module 32 is inserted from a one-end opening 30f (FIG. 7). The main substrate 10, the power supply substrate 11, and the sub substrate 12 are located around the camera module 32 inserted into the chassis 30, which brings a state where the camera module 32 is encompassed by the main substrate 10, the power supply substrate 11, and the sub substrate 12.

Figure 8:
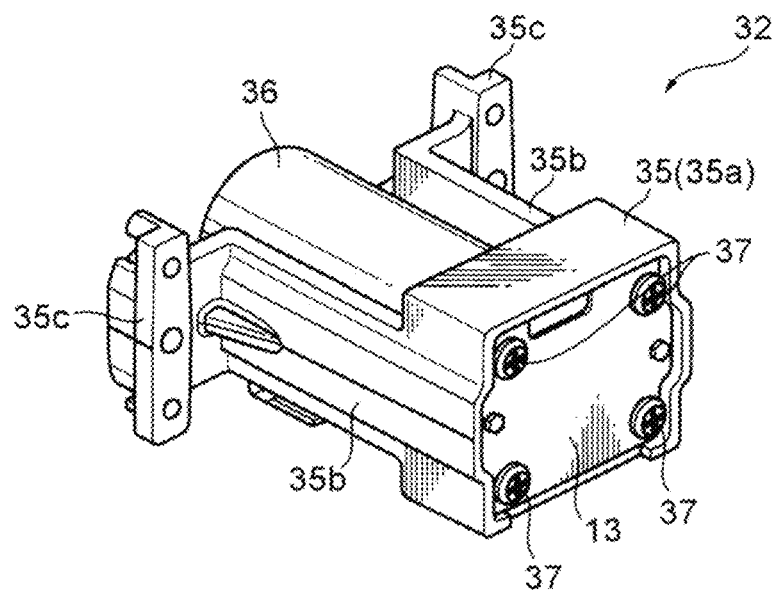
FIG. 8 is a view when a camera module is seen from an obliquely rear side.
Figure 9:
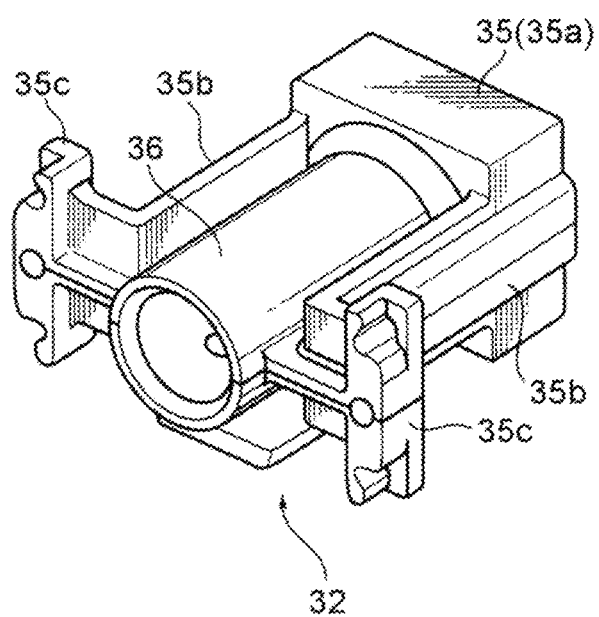
FIG. 9 is a view when the camera module is seen from an obliquely front side.

Referring to FIGS. 8 and 9, the camera module 32 has a camera holder 35 made of a die casting material such as aluminum, and the camera holder 35 has a holder body 35a having a rectangular cross section, a pair of arms 35b extending forward and parallel to each other from side surfaces of the holder body 35a opposed to each other, and a pair of attachment portions 35c extending from front ends of the pair of arms 35b in directions away from each other. The CMOS substrate 13 is fixed to a rear end surface opening rearward of the holder body 35a by a plurality of screws 37 (FIG. 8).

For positioning of the main substrate 10 and the power supply substrate 11, six claws 38 are integrally formed in the chassis 30 (FIG. 7), and using these six claws 38, the main substrate 10 and the power supply substrate 11 opposed to the same are positioned on two open side surfaces 30b, 30d of the chassis 30 opposed to each other, respectively. Cut-outs 10a to receive the claws 38 are formed in the main substrate 10 (FIG. 7). Cut-outs 11a are similarly formed in the power supply substrate 11 (FIG. 3). Referring to FIG. 7, the rectangular sub substrate 12 has a pair of through-holes 12a, 12b at diagonally opposite corner portions, and a pair of through-holes 30g (one of the through-hole does not appear in the drawing for a drawing reason) is formed in the chassis 30 corresponding to the pair of through-holes 12a, 12b. These through-holes 12a, 12b, and 30g are matched, which allows the sub substrate 12 to be mounted on the chassis 30 by the screws.

Figure 10:
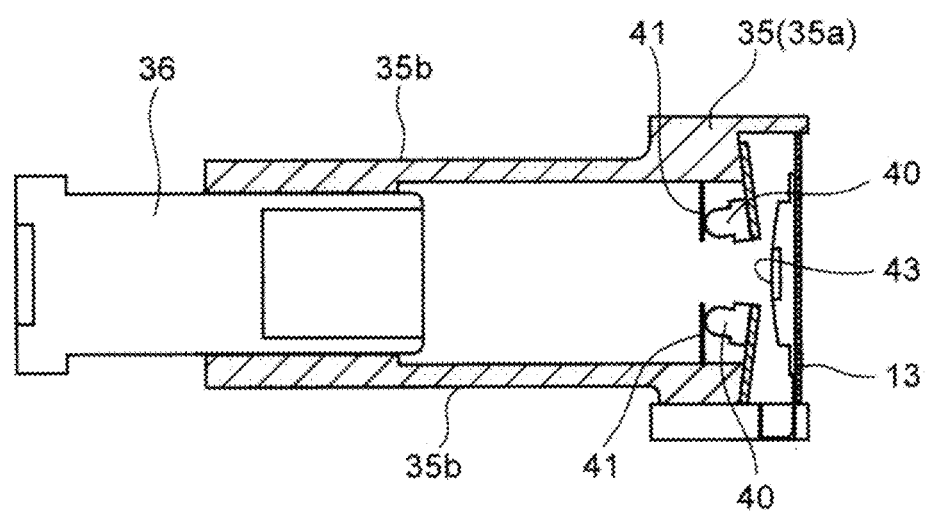
FIG. 10 is a conceptual view for describing an internal structure of the camera module.

Arrangement of LEDs for Pointer (FIG. 10):

The camera module 32 has the cylindrical lens assembly 36, and the lens assembly 36 is disposed between the pair of arms 35b, 35b of the camera holder 35. Referring to FIG. 10, the CMOS substrate 13 is fixed to a rear-end opening of the holder body 35a, using the screws 37 (FIG. 8). A pair of LEDs 40, 40 for pointer is mounted on the CMOS substrate 13. In connection with the LEDs 40 for pointer, diffusion sheets 41 are disposed immediately in front of the respective LEDs 40 for pointer in the holder body 35a. Light of the two LEDs 40 for pointer is radiated forward through the diffusion sheets 41 and the lens assembly 36, and points to two points at a distance from each other within a visual field range of the bar code reader 2. Reference numeral 43 in FIG. 10 denotes a CMOS image sensor which is an optical reading element, and the optical reading element 43 is installed in the CMOS substrate 13.

The LEDs 40 for pointer are incorporated in the camera module 32, which makes it easy to keep a relational position between the optical reading element 43 and the LEDs 40 for pointer constant, and to downsize the bar code reader 2. Particularly, the LEDs 40 for pointer share the lens assembly body 36 of the bar code reader 2 with the optical reading element 43, which makes it easy to downsize the bar code reader 2 because dedicated lenses for the LEDs 40 for pointer become unnecessary.

The camera module 32 is characterized in that a distance between the optical reading element (image pickup element) 43 and the lens assembly 36 is very large as compared with a case in the related art, and that in the optical information such as the bar code and the QR code, even an ultramicro region thereof can be read with a high resolution. When the camera module 32 larger in length dimension as compared with the related art is contained in the bar code reader 2, the above-described substrate arrangement should be noted. That is, introducing the technical idea of surrounding the camera module 32 by the main substrate 10, the power supply substrate 11 and the sub substrate 12 enables the long camera module 32 to be contained in the outer case while downsizing the bar code reader 2.

Specifications of the camera module 32 are as follows.
(1) Optical magnification: 0.6 to 1.0 fold (in the embodiment, 0.823 fold)
(2) Visual field range: 7.5 mm×4.8 mm to 4.5 mm×2.9 mm (in the embodiment, 5.5 mm×3.5 mm)
(3) Distance from the optical reading element to the lens at a fore-end: 35 mm or more (in the embodiment, 40 mm)

Figure 11:
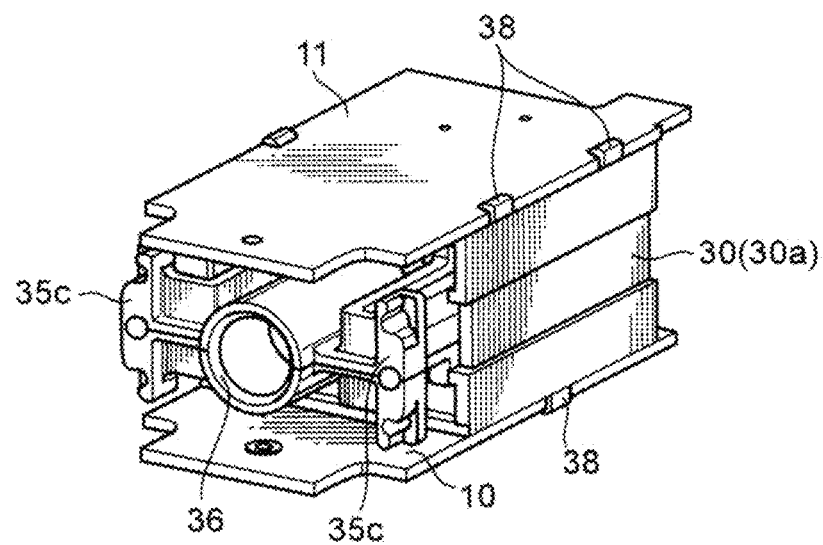
FIG. 11 is a view showing relationships between the camera module and the various types of substrates, wherein the bar code reader is contained in a main case of the bar code reader in this state.
Figure 12:
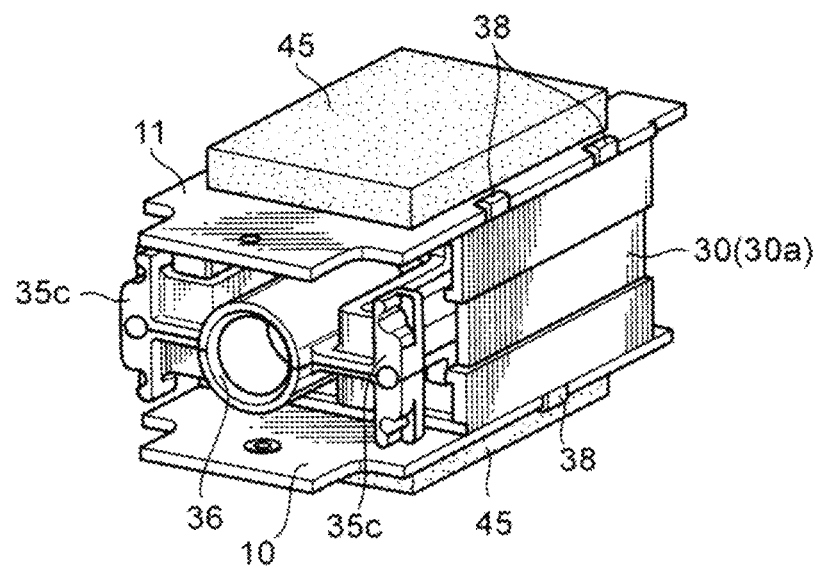
FIG. 12 is a view showing the relationships between the camera module and the various types of substrates as in FIG. 11, wherein as a preferable example, thermally conductive rubbers as heat releasing members are placed on the power supply substrate and the main substrate.

FIG. 11 is a perspective view of an assembly in which the substrates 10, 11, 12 and the camera module 32 are assembled to the chassis 30. FIG. 12 shows a state where thermally conductive rubbers 45 are respectively placed on the main substrate 10 and the power supply substrate 11 as heat releasing members having cushion properties and excellent thermal conductivity. If the heat release properties of the bar code reader 2 are required, the assembly is contained in the main case 6 (FIG. 2) having the rectangular cross section with the thermally conductive rubbers 45 attached in the aspect illustrated in FIG. 12 (FIG. 13).

The main substrate 10 and the power supply substrate 11 are arranged adjacent to, and along the different side surfaces of the main case 6 having the polygonal cross section and made of a metal material excellent in thermal conductivity, which makes it easy to release heat of the main substrate 10 and the power supply substrate 11 outside, and enables the camera modules 32 to be contained in the space surrounded by the main substrate 10 and the power source substrate 11, thereby enabling the further downsizing of the bar code reader 2. Particularly, interposing the heat releasing members such as the thermally conductive rubbers 45 between the main substrate 10 and the main case 6, and between the power substrate 11 and the main case 6, can increase heat release efficiency, and can further downsize the bar code reader 2 from this view point.

Figure 13:
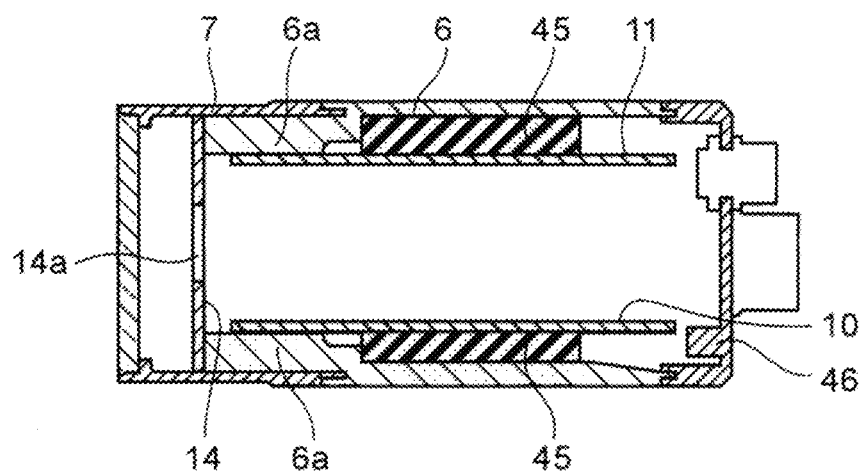
FIG. 13 is a view for describing a state where the thermally conductive rubbers abut on the power supply substrate, the main substrate, and the main case in connection with FIG. 12.
Figure 15:
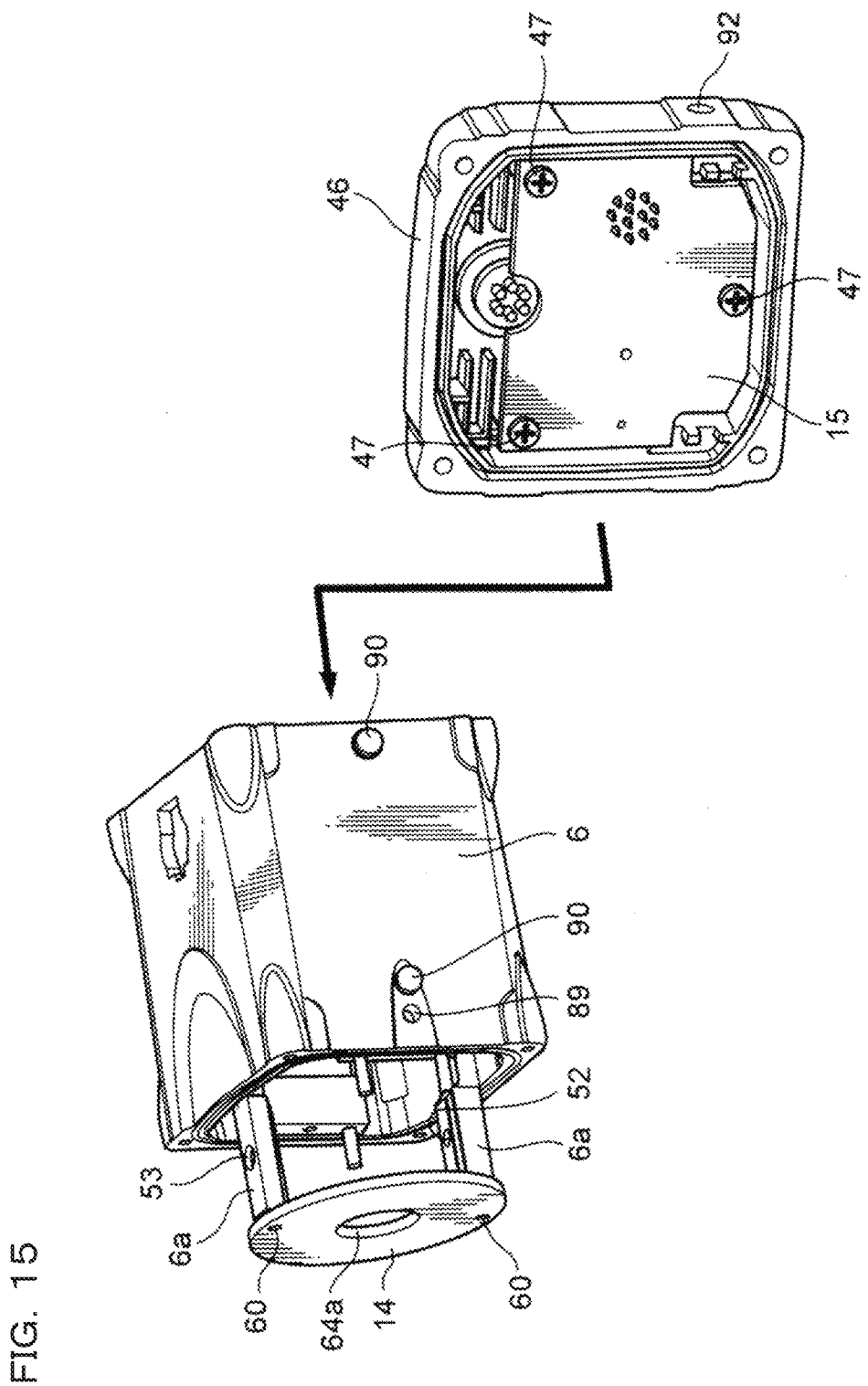
FIG. 15 is an exploded perspective view for describing the main case of the bar code reader, and how an open rear end of the main case is closed by a rear case, wherein a connector substrate is fixed to the rear case.

Reference numeral 46 in FIGS. 13 and 15 denotes a rear case, which is detachably attached to a rear-end opening of the main case 6 to close the main case 6. The connector substrate 15 is attached to the rear case 46 and the connector substrate 15 is fixed to the rear case 46 using screws 47 (FIG. 15). For example, the main case 6, the front case 7, and the rear case 46 making up the outer case of the bar code reader 2 is preferably made of a metal material excellent in thermal conductivity, for example, a thermally conductive material such as aluminum.

Referring to FIG. 6, the main substrate 10 and the power source substrate 11 have through-holes 50, 51 in front-end narrow-width portions, respectively. The main case 6 of the bar code reader 2 has a pair of rod-like extended portions 6a, which extend parallel to each other and forward to an inside of the cylindrical front case 7 (FIG. 15).

Figure 14:
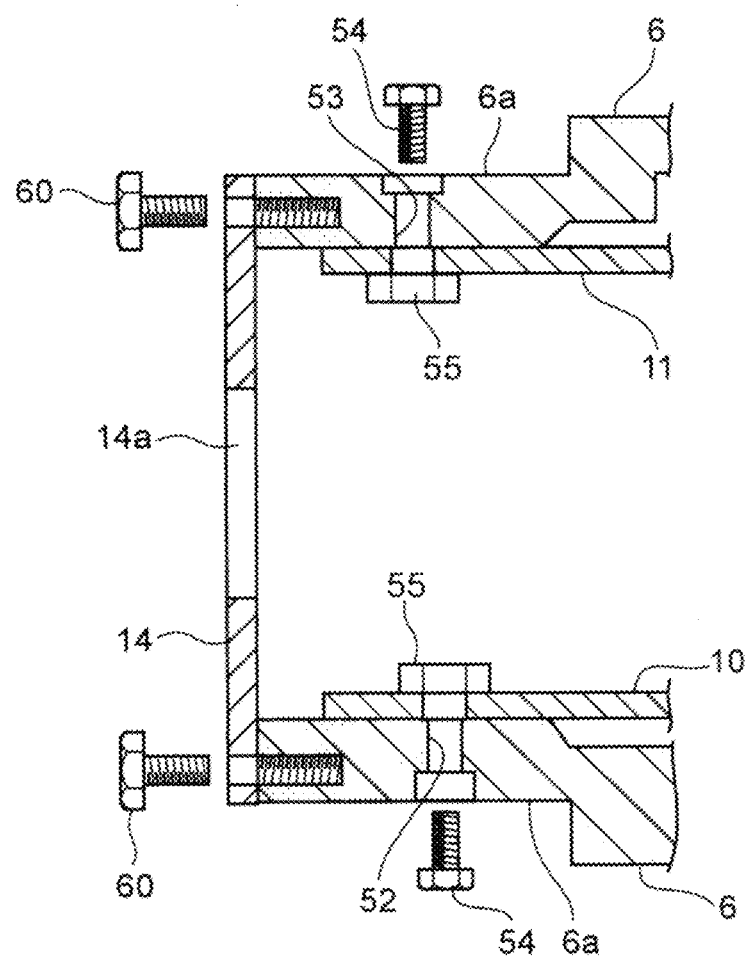
FIG. 14 is a view for describing that an LED substrate (internal illumination substrate) is attached to front end surfaces of a pair of rod-like extended portions extending forward from the main case, and front ends of the power supply substrate and the main substrate are fixed to the extended portions.

Referring to FIG. 14 in which a front end portion of the main case 6 is extracted, through-holes 52, 53 related to the through-holes 50, 51 of the front-end narrow-width portions of the main substrate 10 and the power supply substrate 11 are formed in the pair of extended portions 6a of the main case 6, and using screws 54 inserted into these through-holes 52, 53, the main substrate 10 and the power supply substrate 11 are fixed to the main case 6 (the extended portions 6a). This allows each of the main substrate 10 and the power supply substrate 11 positioned by the three claws 38 of the chassis 30 to be fixed to each of the extended portions 6a extending forward of the main case 6 by one of the screws 54. In other words, the chassis 30 is fixed to the main case 6 by the total of two screws 54. In order to facilitate work of tightening the screws 54 and work of removing the screws 54, nuts 55 into which the screws 54 are screwed are preferably installed at the through-hole 50 of the main substrate 10 and the through-hole 51 of the power supply substrate 11. To the pair of rod-like extended portions 6a of the main case 6 is fixed the ring-shaped LED substrate 14 at a front-end surface thereof by screws 60. The ring-shaped LED substrate 14 is arranged around the lens assembly 36, and the plurality of illumination LEDs 80 mounted on the LED substrate 14 form a ring-shaped surface light source located on the outer circumferential side of the lens assembly 36.

Figure 16:
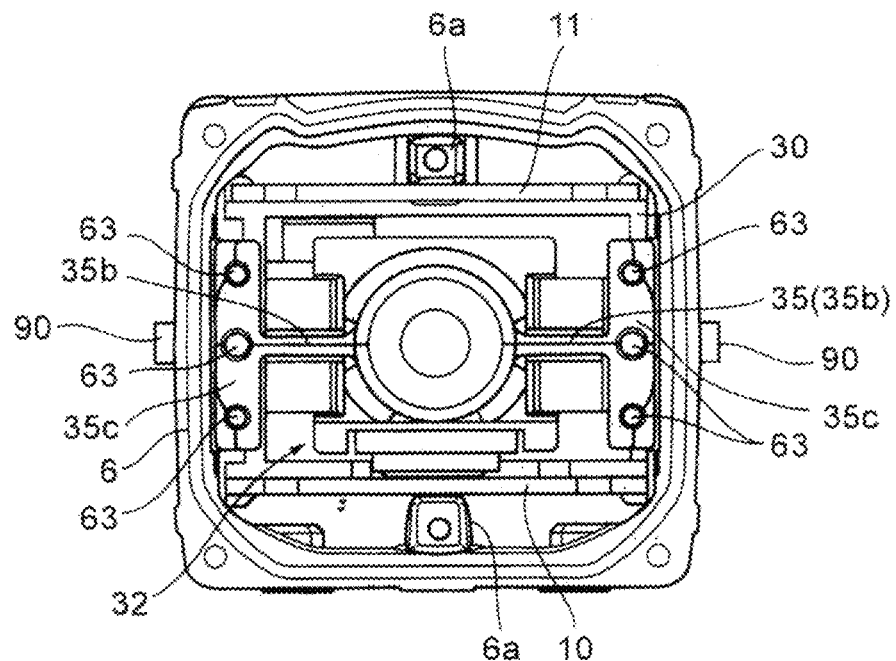
FIG. 16 is a front view of the main case containing incorporated members illustrated in FIG. 15.
Figure 17:
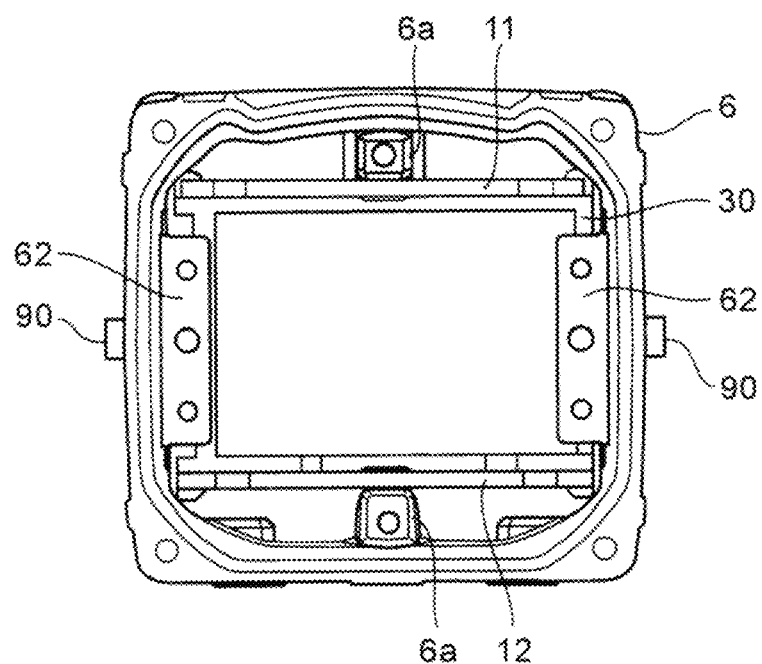
FIG. 17 is a front view of the main case in a state where the camera module is removed from FIG. 16.

FIG. 17 is a view when the main case 6 is seen from the front side. The main case 6 has a pair of right and left attachment seats 62 in the front-end surface thereof, and the camera module 32 is fixed to the main case 6, using this pair of attachment seats 62. FIG. 16 is a front view of the main case 6 with the camera module 32 incorporated therein. FIG. 17 is a front view of the main case 6 illustrated in a state where the camera module 32 is removed.

Fixing the camera module 32 to the main case 6, which is a metal molded article, can increase positioning accuracy of the camera module 32, thereby increasing positioning accuracy of the visual field range, as compared with a case where the camera module 32 is fixed to the chassis 30.

Since there is employed a configuration in which the assembly in which the major substrates incorporated in the bar code reader 2, that is, the power supply substrate 11, the main substrate 10, and the like, and the camera module 32 including the lens assembly 36 are assembled to the chassis is incorporated in the outer case (main case 6), preparing a plurality of types of camera modules 32 enables a plurality of types of bar code readers 2 to be provided to a user, using the same outer case. For the different types of camera modules 32, the same power supply substrate 11, the main substrate 10, and the like are employed, and the same outer case is used to manufacture the bar code reader 2.

The pair of right and left attachment portions 35c of the camera module 32 are seated on the pair of right and left attachment seats 62 of the main case 6, and the respective attachment portions 35c are fixed to the corresponding attachment seats 62, using four screws 63 (FIG. 16).

Figure 18:
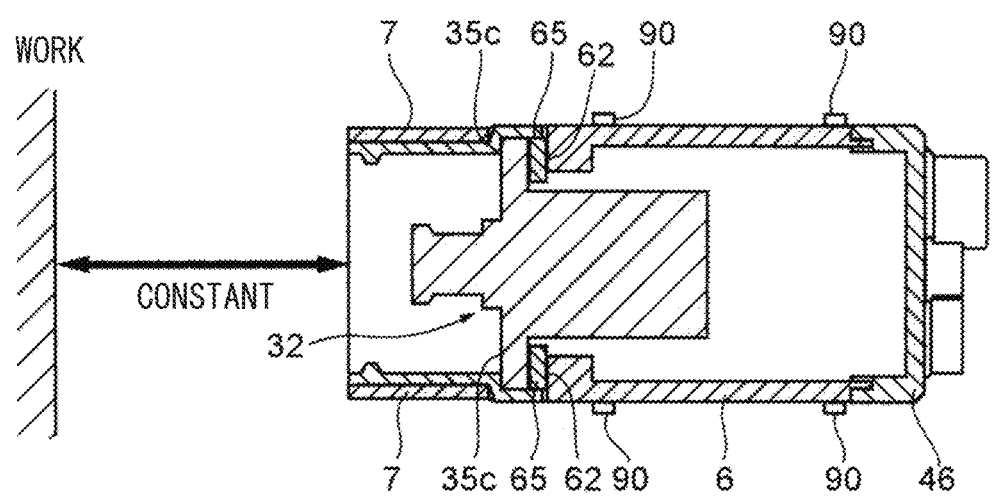
FIG. 18 is a view for describing a device that adjusts a focal distance of the camera module fixed to the main case.
Figure 19:
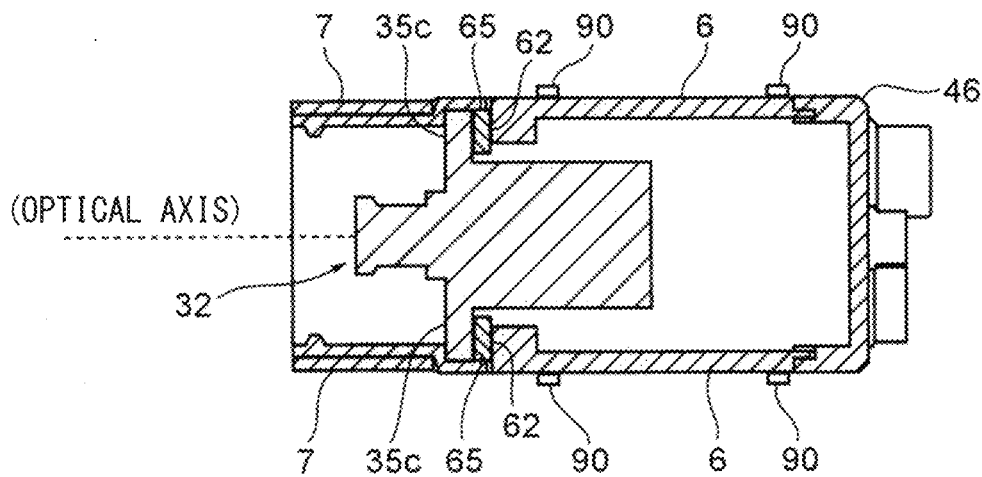
FIG. 19 is a view for describing a device that adjusts deviation of an optical axis of the camera module fixed to the main case.

Spacers 65 are interposed between the attachment seats 62 of the main case 6 and the attachment portions 35c of the camera module 32 (FIG. 18). As the spacers 65, preferably, a plurality of types of spacers 65 having different thickness dimensions are prepared in advance, or one or more spacers 65 each having the same thickness dimension may be layered to adjust variation in focal distance of the bar code reader 2. Moreover, the focal distance of the bar code reader 2 is varied by using the plurality of types of spacers 65 having different thickness dimensions, by which the bar code readers 2 having different focal distances while sharing the same outer case can be provided to the user. Moreover, by preparing the plurality of types of spacers 65 having different thickness dimensions, optical axis adjustment of the camera module 32 is preferably performed using the spacers 65 having different thickness dimensions so that an optical axis of the camera module 32 is a proper optical axis (FIG. 19).

Figure 20:
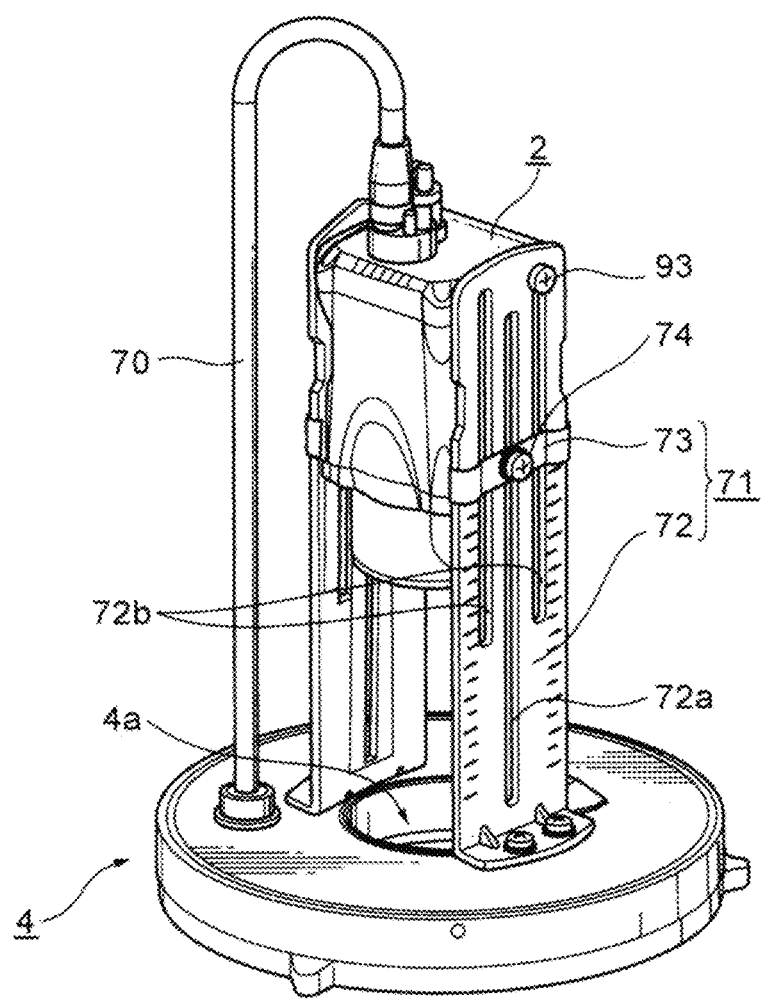
FIG. 20 is a view showing a state where an external illumination unit is attached to the bar code reader.

Dedicated External Illumination Unit 4 (FIGS. 20 to 31):

FIG. 20 shows a state where the dedicated external illumination unit 4 is attached to the bar code reader 2, and reference numeral 70 denotes a cable connecting the bar code reader 2 and the external illumination unit 4. The power of the external illumination unit 4 is supplied from the bar code reader 2.

The external illumination unit 4 in a ring outer shape has a circular outline, and has a circular opening 4*a* in its center. The bar code reader 2 is positioned so that the center of the circular opening 4*a* matches the optical axis of the lens assembly 36 of the bar code reader 2. A stand 71 is prepared to position the bar code reader 2. As will be described in detail later, the stand 71 is made up of a pair of plate members 72 fixed to a back surface of the external illumination unit 4 by bolts, and attachment fittings 73 to fixedly set the bar code reader 2 at an arbitrary height position of the plate members 72.

Figure 21:
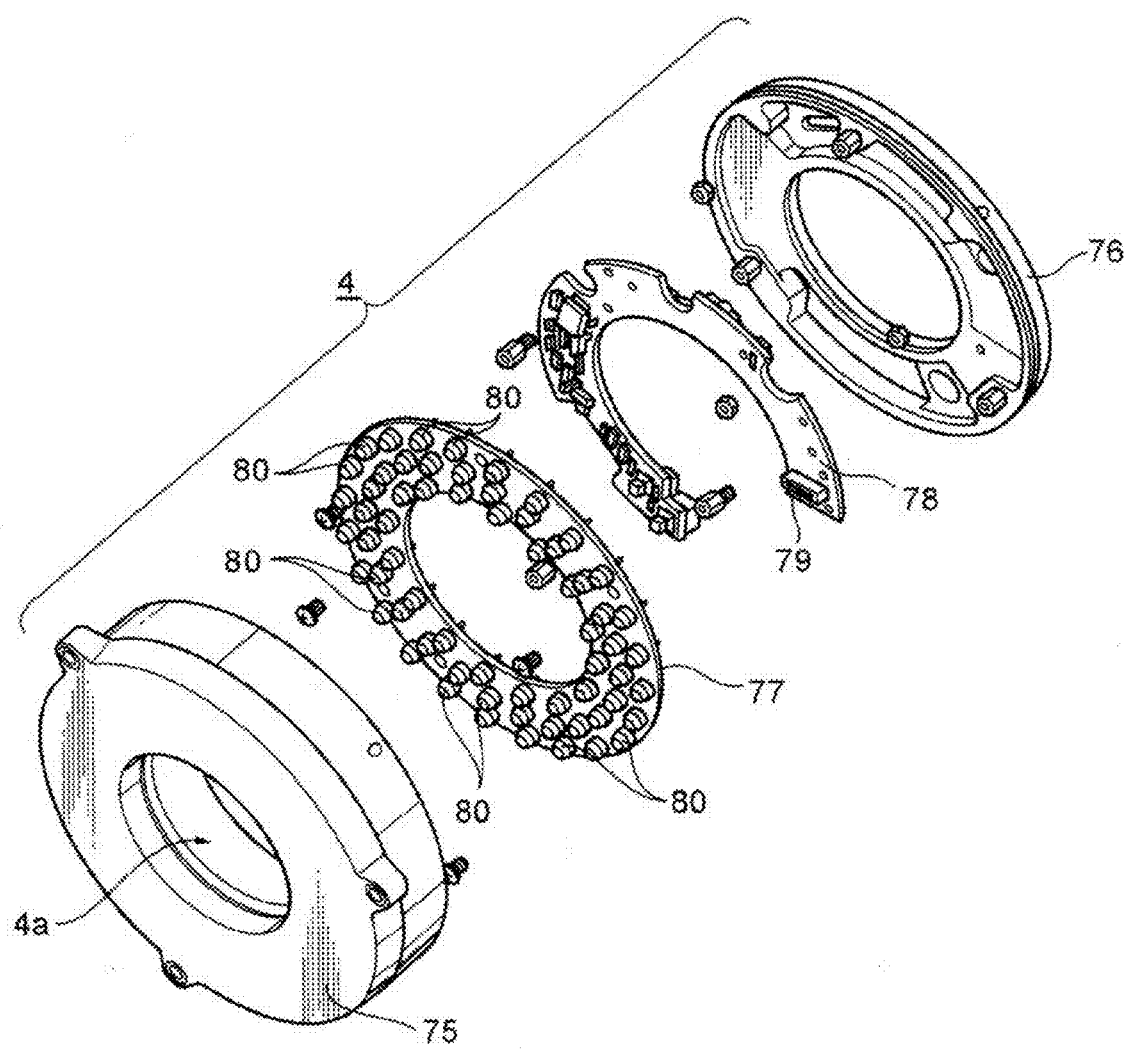
FIG. 21 is an exploded perspective view of the external illumination unit.
Figure 22:
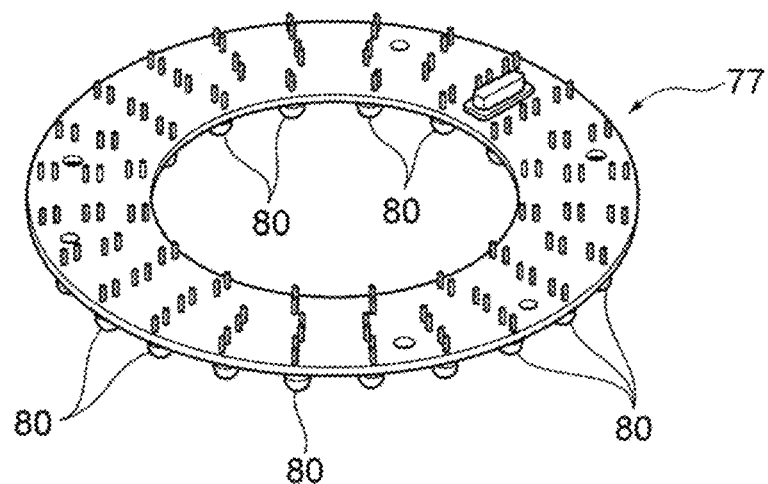
FIG. 22 is a perspective view of the LED substrate with LEDs to be incorporated in the external illumination unit.

First, a structure of the external illumination unit 4 will be described with reference to FIG. 21. FIG. 21 is an exploded perspective view of the external illumination unit 4. In the external illumination unit 4, an LED substrate 77 and a circuit substrate 78 are contained in an outer case made up of ring-shaped, cylindrical front case 75 and rear case 76 in a layered state with a stack connector 79 (FIG. 21) and first spacers 82 (FIG. 23) interposed therebetween.

Figure 23:
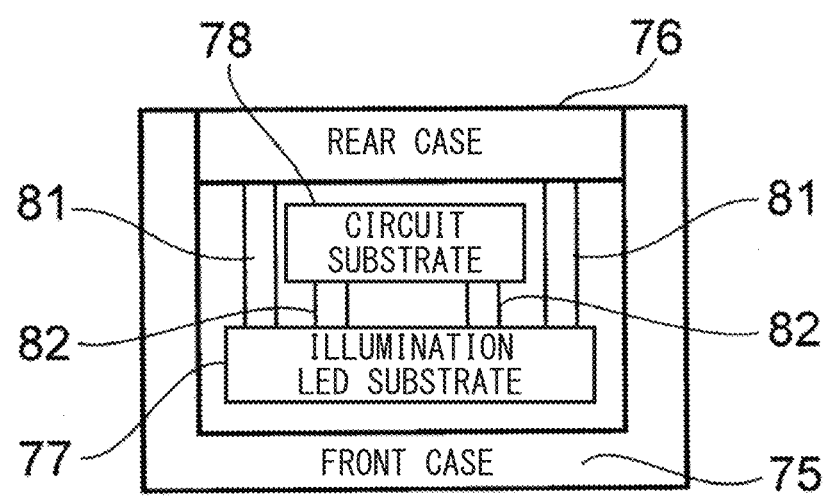
FIG. 23 is a diagram for describing attachment relationships of two substrates assembled to the external illumination unit.

The plurality of illumination LEDs 80 are installed in the ring-shaped LED substrate 77 having almost the same size as that of a ring cross-sectional shape of the ring-shaped, cylindrical front case 75. In the ring-shaped circuit substrate 78 preferably having almost the same size as the ring-shaped LED substrate 77, a CPU that controls the lighting of the plurality of LEDs 80 mounted on the external illumination unit 4, and controls communication with the bar code reader 2, and a memory M (FIG. 1) is installed in addition to an LED drive circuit. Referring to FIG. 23, obviously, the LED substrate 77 and the circuit substrate 78 are electrically connected, and the LED substrate 77 and circuit substrate 78 are fixed to each other by the first spacers 82, and the LED substrate 77 is fixed to the rear case 76 by second spacers 81. In other words, the circuit substrate 78 is fixed to the rear case 76 via the LED substrate 77.

Particularly, when a Fresnel lens 102 (FIG. 30) described later is employed in the front case 75, relative positioning between the illumination LEDs 80 of the LED substrate 77 and the front case 75 is important. In the example of FIG. 23, since the LED substrate 77 is positioned with respect to the front case 75 via the rear case 76, this not only allows the front case 75 and the LED substrate 77 to be relatively positioned, but also facilitates assembling work of the LED substrate 77 and the circuit substrate 78.

As a first modification, regarding a setting structure of the LED substrate 77 and the circuit substrate 78, instead of interposing the LED substrate 77, the circuit substrate 78 may be directly fixed to the rear case 76 via spacers. As a second modification, the circuit substrate 78 may be fixed to the rear case 76 via spacers, and the LED substrate 77 may be fixed to the circuit substrate 78 via other spacers.

Figure 24:
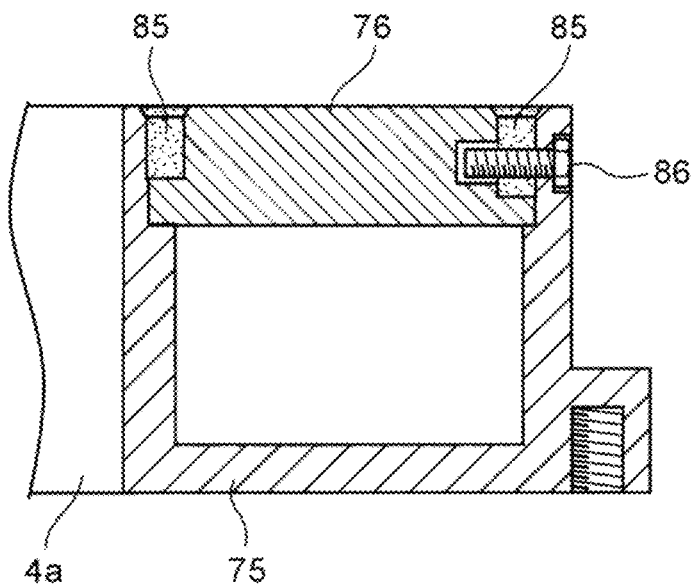
FIG. 24 is a view showing one example of a sealing structure between a front case and the rear case making up an outer case of the external illumination unit.
Figure 25:
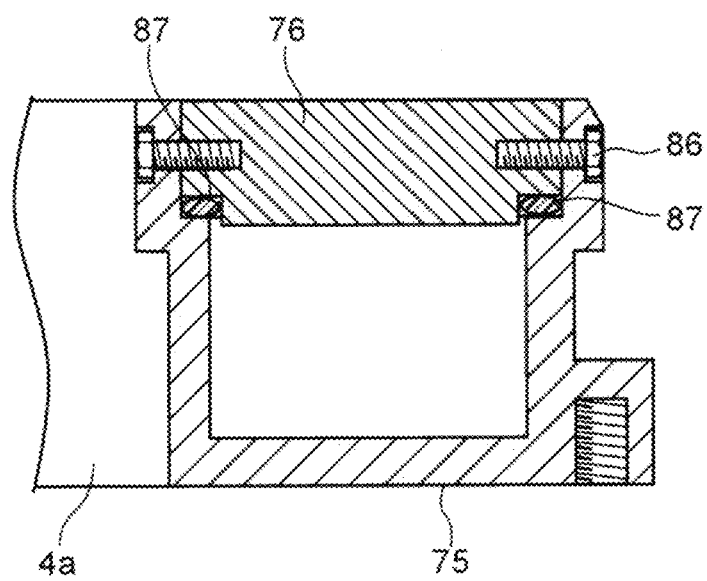
FIG. 25 is a view showing another example of the sealing structure between the front case and the rear case making up the outer case of the external illumination unit.

FIGS. 24 and 25 show the outer case of the external illumination unit 4 configured in a form in which the rear case 76 is fitted in a rear-end opening of the ring-shaped, cylindrical front case 75. As shown in FIG. 24, an adhesive 85 is applied to a circumferential surface of the rear case 76 to fit the rear case 76 in the front case 76, or after applying the adhesive 85 to the front case 75, the ring-shaped, disc-like rear case 76 is fitted, or after fitting the rear case 76 in the front case 75, a clearance therebetween is filled up with the adhesive 85 or a sealant, or the like. With the above methods, the adhesive 85 or the sealant may be interposed in the clearance between the front case 75 and the rear case 76 to assure the sealing performance of the outer case by the adhesive 85 or the sealant. In such cases, both the cases 75, 76 may be fixed using at least one screw 86 as needed.

Referring to FIG. 25, gaskets 87 may be interposed between the front case 75 and the rear case 76 to assure the sealing performance by these gaskets 87.

Figure 26:
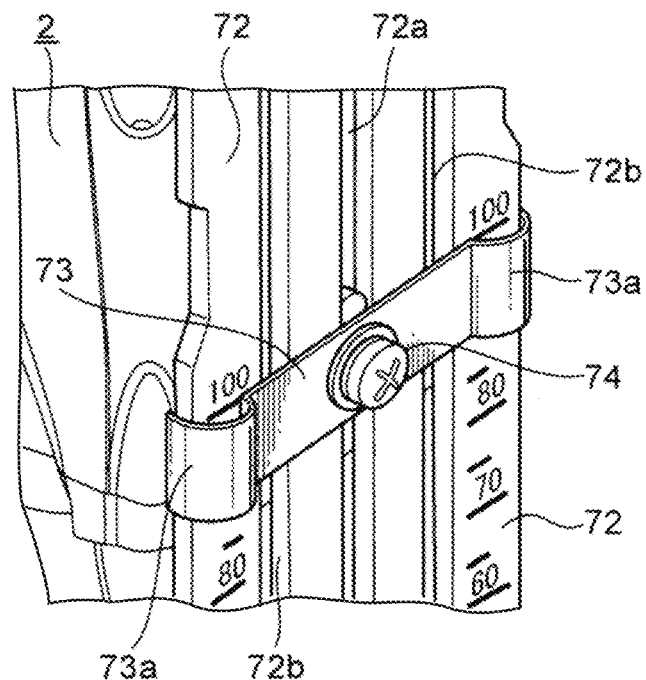
FIG. 26 is a partial perspective view, wherein an upper end portion of a plate member, which is a tool for assembling the external illumination unit to the bar code reader, is extracted.
Figure 27:
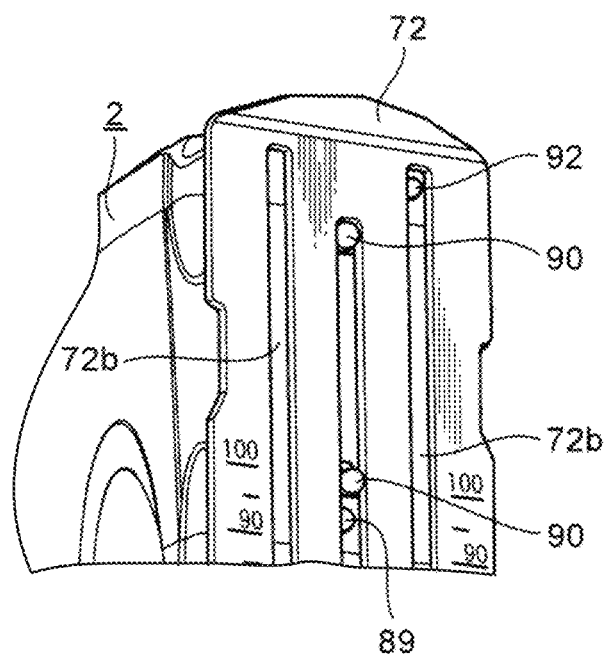
FIG. 27 is a partial perspective view, wherein a portion of the plate member for describing a fastening structure between the plate member and the bar code reader, is extracted.

Positioning Mechanism of Dedicated External Illumination Unit 4 (FIGS. 26 to 29):

FIGS. 26 and 27 are detailed views of the stand 71 (FIG. 20). Referring to FIGS. 20 and 26, a pair of rectangular plate members 72 that each rises from a portion adjacent to the back surface of the external illumination unit 4 and the central circular opening 4*a* extends parallel to each other in a state opposed to each other in a radial direction of the central circular opening 4*a*.

The plate members 72 each have a guide slit 72*a* extending vertically, and at least one sub slit 72*b* parallel to this guide slit 72*a*.

Each of the attachment fittings 73 has a form of crossing the plate member 72, and having right and left folded-back portions 73*a* that is engaged with both side edges of the plate member 72, and further has spring properties. A screw 74 is preferably attached in a central site of the attachment fitting 73 so as not to drop.

The screws 74 are screwed into screw holes 89 (FIGS. 15 and 27) of the bar code reader 2 arranged between the pair of plate members 72. The bar code reader 2 includes projected pins 90 that are received by the guide slits 72*a* of the plate members 72 (FIGS. 2 and 15). Two projected pins 90 are provided in each of side surfaces opposed to each other of the main case 6 of the bar code reader 2, and a line connecting the two projected pins 90 is parallel to the optical axis of the bar code reader 2. More specifically, two projected pins 90 are provided in each of the side surfaces opposed to each other of the main case 6 having a rectangular cross section, and the two projected pins 90 are respectively arranged at one end portion and the other end portion of the side surface of the main case 6. Moreover, the screw hole 89 that receives the screw 74 of each of the attachment fitting 73 is formed at a front end portion of the main case 6 (at an end portion on the front case 7 side).

The screws 74 of the attachment fittings 73 having spring properties are loosened to position the bar code reader 2 at a desired height of the pair of plate members 72, and then the screws 74 are screwed, thereby bringing the attachment fittings 73 into close contact with the plate members 72, which allows the bar code reader 2 to be fixed to the plate members 72. In addition, screw holes 92 (FIGS. 2 and 15) may be provided in side surfaces of the bar code reader 2 (e.g., of rear case 46), and second screws 93 to be screwed into these screw holes 92 may be used to fasten the plate members 72 and the bar code reader 2 to each other (FIG. 20). The second screws 93 are arranged in the sub slits 72*b* of the plate members 72. This allows the side surfaces opposed to each other of the bar code reader 2 to be fixed to the respective plate members 72 by the two types of screws 74, 93 located at a distance from each other in vertical and width directions.

As best seen in FIG. 20, the guide slits 72*a* each extend linearly from one longitudinal end portion to the other longitudinal end portion of the plate member 72, and parallel to the optical axis of the bar code reader 2. This allows a height position of the bar code reader 2 to be adjusted while keeping the optical axis of the bar code reader 2 constant.

While each of the sub slits 72b extends parallel to the guide slits 72a, a lower end of the sub slit 72 ends in a middle portion in the longitudinal direction of the plate member 72. By ending the lower ends of the sub slits 72b in the middle portions in the height direction of the plate members 72 in this manner, the following advantages can be obtained. When the first screws 74 of the attachment fittings 73 and the second screws 93 inserted into the sub slits 72b are both loosened to adjust the height position of the bar code reader 2, due to the spring properties of the attachment fittings 73, the bar code reader 2 is basically held at the position unless the user moves up and down the bar code reader 2. However, the above-described arrangement can prevent the bar code reader 2 from being largely lowered at a moment when the user loses hold of the bar code reader 2 for some reason, thereby damaging the bar code reader 2. This dropping restriction of the bar code reader 2 is because of the setting of ending the lower ends of the sub slits 72b at the relatively high position. Further, the second screws 93 screwed into the bar code reader 2 are locked in the lower ends of the sub slits 72b, which allows the lower ends of the sub slits 72b to function as stoppers, thereby avoiding excessive dropping of the bar code reader 2.

Figure 28:
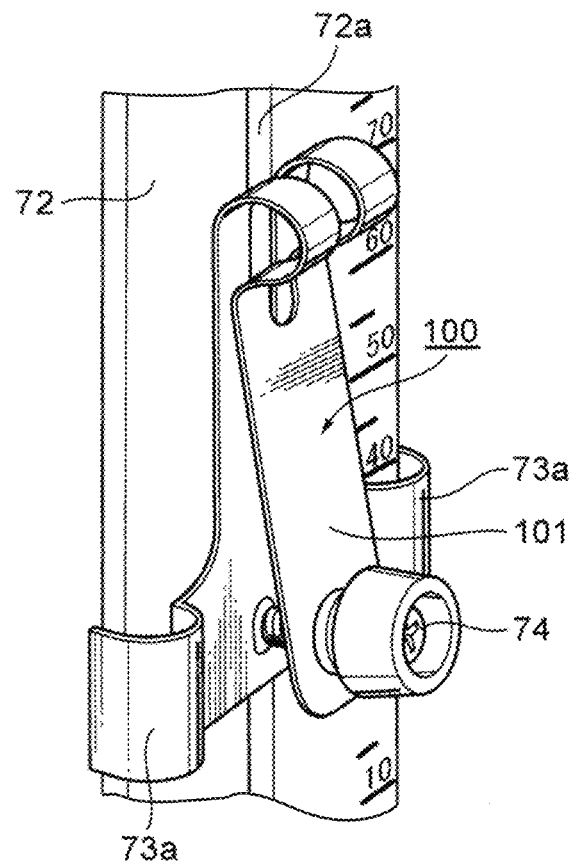
FIG. 28 is a view showing a modification of an attachment fitting provided in the plate member.
Figure 29:
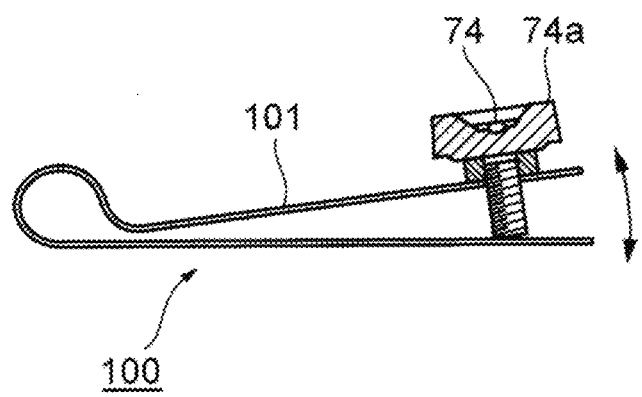
FIG. 29 is a cross-sectional view of the attachment fitting illustrated in FIG. 28.

FIGS. 28 and 29 show attachment fittings 100 as a modification. Each of the attachment fittings 100 has a free end portion 101 that extends upward from a middle portion of the right and left folded-back portions 73a and then turns over to extend downward, and the first screw 74 is attached to this free end portion 101 so as not to drop off through a screw holder 74a. According to the attachment fittings 100 of this modification, even if the first screws 74 completely come off from the bar code reader 2, careless coming-off of the first screws 74 from the attachment fittings 100 can be avoided.

Figure 30:
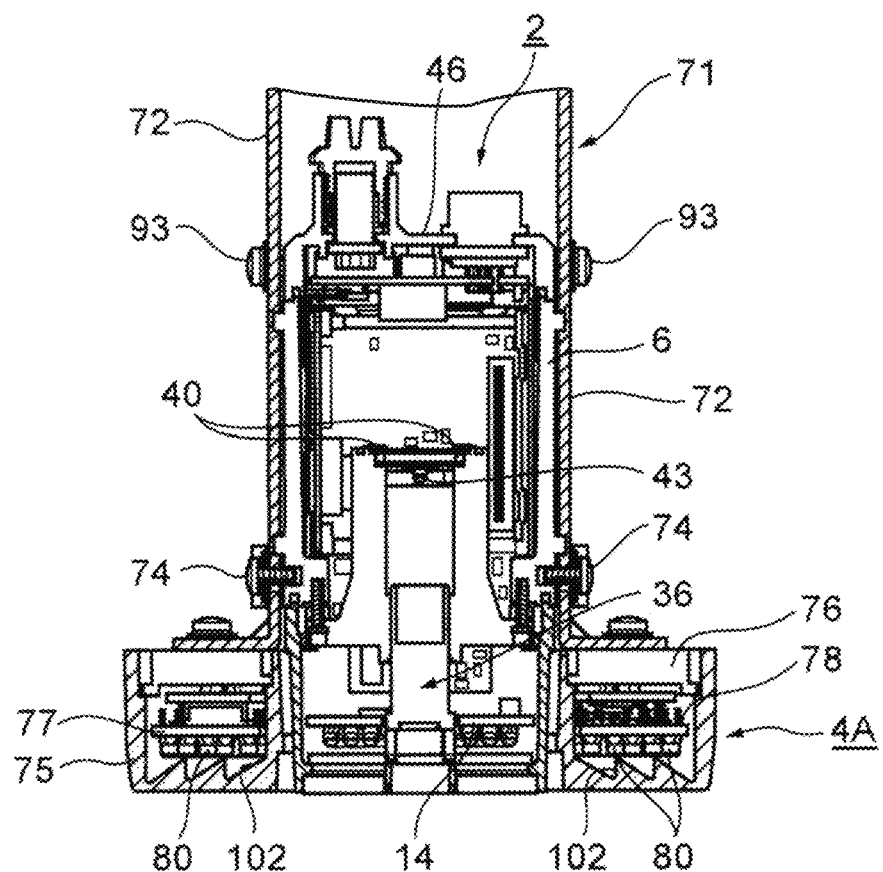
FIG. 30 is a cross-sectional view of a state where a dedicated external illumination unit having a small diameter is attached to the bar code reader.
Figure 31:
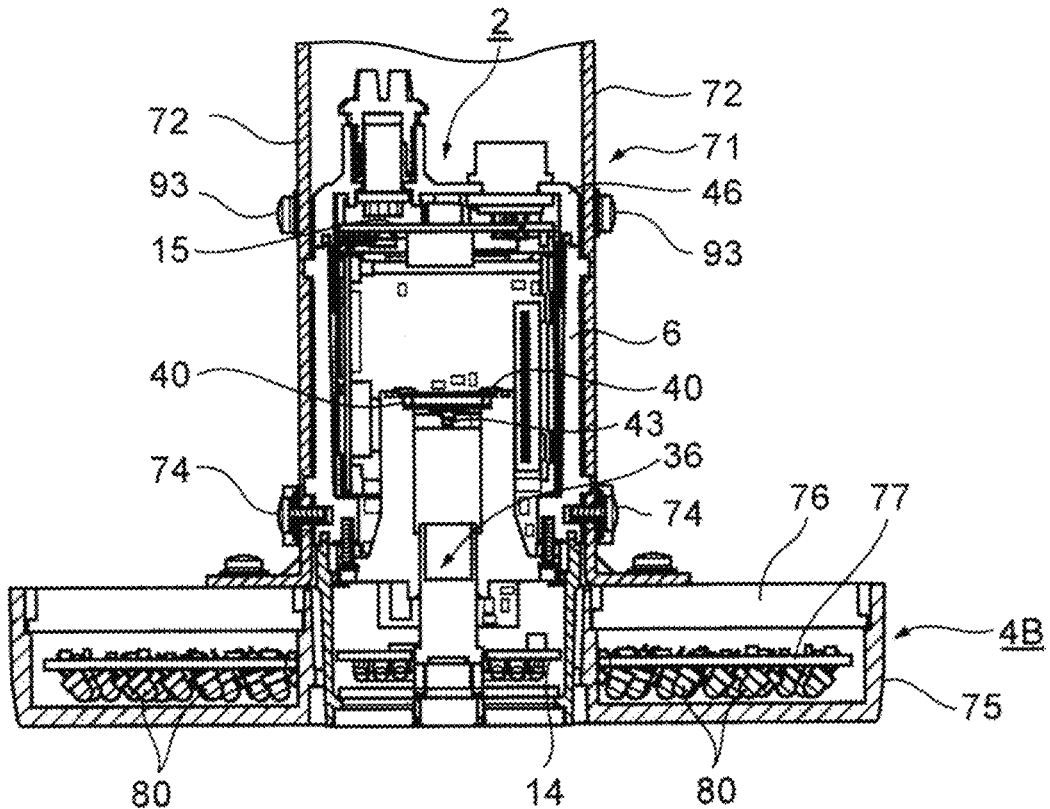
FIG. 31 is a cross-sectional view of a state where a dedicated external illumination unit having a large diameter is attached to the bar code reader.

Types of Dedicated External Illumination Unit 4 (FIGS. 30 and 31):

FIGS. 30 and 31 show a state where the external illumination unit 4 is attached to the bar coder reader 2, wherein FIG. 30 shows a first type of external illumination unit 4A having a small diameter with a relatively small number of LEDs 80, and FIG. 31 shows a second type of external illumination unit 4B having a large diameter with a relatively large number of LEDs 80. When the first and second types of external illumination units 4A, 4B are prepared, the user can use the first and second external illumination units 4A, 4B, depending on an environment where the bar code reader system 1 is installed and the like. Model information is stored in the memory M (FIG. 1) of the external illumination unit 4, and when the external illumination unit 4 is connected to the bar code reader 2, the bar code reader 2 takes in the model information stored in the memory M of the external illumination unit 4 to thereby recognize the external illumination unit 4, which allows connection setting with the external illumination unit 4 to be executed.

The external illumination unit 4A having the small diameter with the relatively small number of illumination LEDs 80 has the Fresnel lens 102 at a translucent portion of the front case 75 (FIG. 30), so that the light of the illumination LEDs 80 mounted on the external illumination unit 4A having the small diameter can be kept in the visual field range of the bar code reader 2 while arranging the illumination LEDs 80 so as to face immediately downward without inclining the illumination LEDs 80. Since the illumination LEDs 80 can be arranged so as to face immediately downward, an installation density of the illumination LEDs 80 of the external illumination unit 4A having the small diameter can be increased. In contrast, in the external illumination unit 4B having the large diameter with the relatively large number of LEDs 80, the respective illumination LEDs 80 are installed in the LED substrate 77 in an inclined state and directed to the visual field range of the bar code reader 2.

Figure 32:
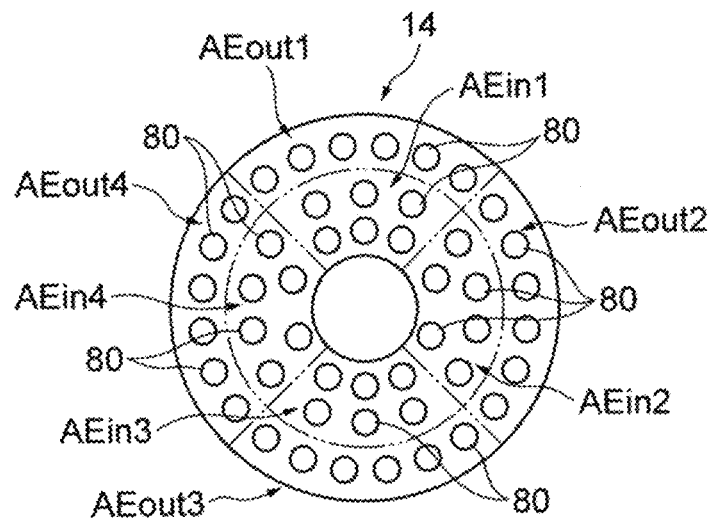
FIG. 32 is a view for describing that LEDs included in an internal illumination unit, which is a surface light source incorporated in the bar code reader, are divided into a plurality of areas to control lighting on the area basis, and is a front view of the internal illumination unit.

Partial Illumination of Internal Illumination Unit 5 (FIG. 32):

FIG. 32 is a plan view of the LED substrate 14 incorporated in the bar code reader 2. In the ring-shaped LED substrate 14, a large number of illumination LEDs 80 are arrayed almost uniformly in an entire circumference thereof. The illumination LEDs 80 are arranged at almost the same interval on three concentric circles at a distance from one another in a radial direction. More particularly, the plurality of illumination LEDs 80 are arrayed on the plurality of concentric circles different in diameter centering on the optical axis of the lens assembly 36 of the bar code reader 2.

In the ring-shaped LED substrate 14, partial illumination is performed, using, as a unit, each of a total of eight areas that are formed by dividing an entire area into four blocks at even intervals in a circumferential direction, and further dividing each of the blocks into two in the radial direction. Specifically, one row in an outermost circumference is divided into four areas at an interval of 90°. These areas are illustrated as an outer circumference first area AEout 1, an outer circumference second area AEout 2, an outer circumference third area AEout 3, and an outer circumference fourth area AEout 4. Two innermost and intermediate rows are divided into four areas at an interval of 90°. These areas are illustrated as an inner circumference first area AEin 1, an inner circumference second area AEin 2, an inner circumference third area AEin 3, and an inner circumference fourth area AEin 4. The LEDs 80 belonging to the respective areas of AEout 1 to AEout 4, and AEin 1 to AEin 4 are positioned so as to be distributed uniformly in the respective areas.

The illumination can be controlled, using each of the areas of the divided areas AEout 1 to AEout 4, and AEin 1 to AEin 4 of the internal illumination unit 5 as a unit. The lighting control by the division into these areas may include control of an amount of luminescence of the LEDs 80.

Figure 33:
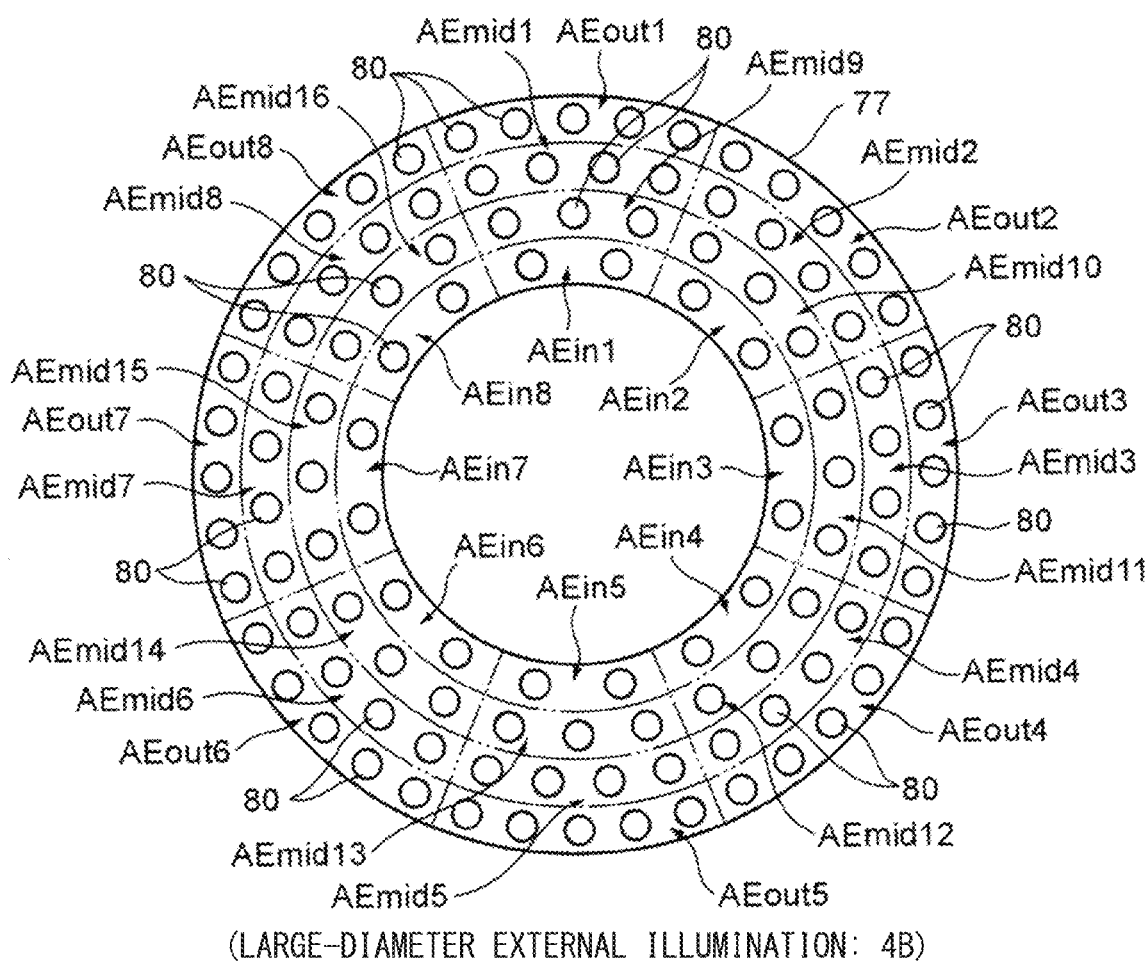
FIG. 33 is a front view of the dedicated external illumination unit having the large diameter, and is a view for describing that LEDs included in this external illumination unit are divided into a plurality of areas to control lighting on the area basis.

Partial Illumination of External Illumination Unit 4B Having Large Diameter (FIG. 33):

FIG. 33 is a plan view of the LED substrate 77 of the external illumination unit 4, and more particularly, shows the LED substrate 77 of the external illumination unit 4B having the large diameter. In the ring-shaped LED substrate 77, a large number of illumination LEDs 80 are arrayed almost uniformly in an entire circumference thereof. The illumination LEDs 80 are arranged at almost the same interval on four concentric circles at a distance from one another in a radial direction. More specifically, the plurality of illumination LEDs 80 are arrayed on the four concentric circles different in diameter centering on the optical axis of the lens assembly 36 of the bar code reader 2.

In the external illumination unit 4B having the large diameter, partial illumination is performed, using, as a unit, each of a total of 32 areas that are formed by dividing an entire area into eight blocks at even intervals in a circumferential direction, and further dividing each of the blocks into four in the radial direction. Specifically, in the ring-shaped LED substrate 77, a row in an outermost circumference is divided into eight areas at an interval of 45°. These areas are illustrated as an outer circumference first area AEout 1 to an outer circumference eighth area AEout 8. The next row is also divided into eight areas at an interval of 45°. These areas are illustrated as an outer intermediate first area AEmid 1 to an outer intermediate eighth area AEmid 8. The next row is also divided into eight areas at an interval of 45°. These areas are illustrated as an outer intermediate ninth area AEmid 9 to an outer intermediate 16th area AEmid 16. A row in an innermost circumference is divided into eight areas at an interval of 45°. These areas are illustrated as the inner circumference first area AEin 1 to an inner circumference eighth area AEin 8. The external illumination unit 4B having the large diameter can also be controlled, using each of a total of 32 areas as a unit. In the external illumination unit 4B as well, the control of the amount of luminescence of the LEDs 80 can be executed on the area basis.

Figure 34:
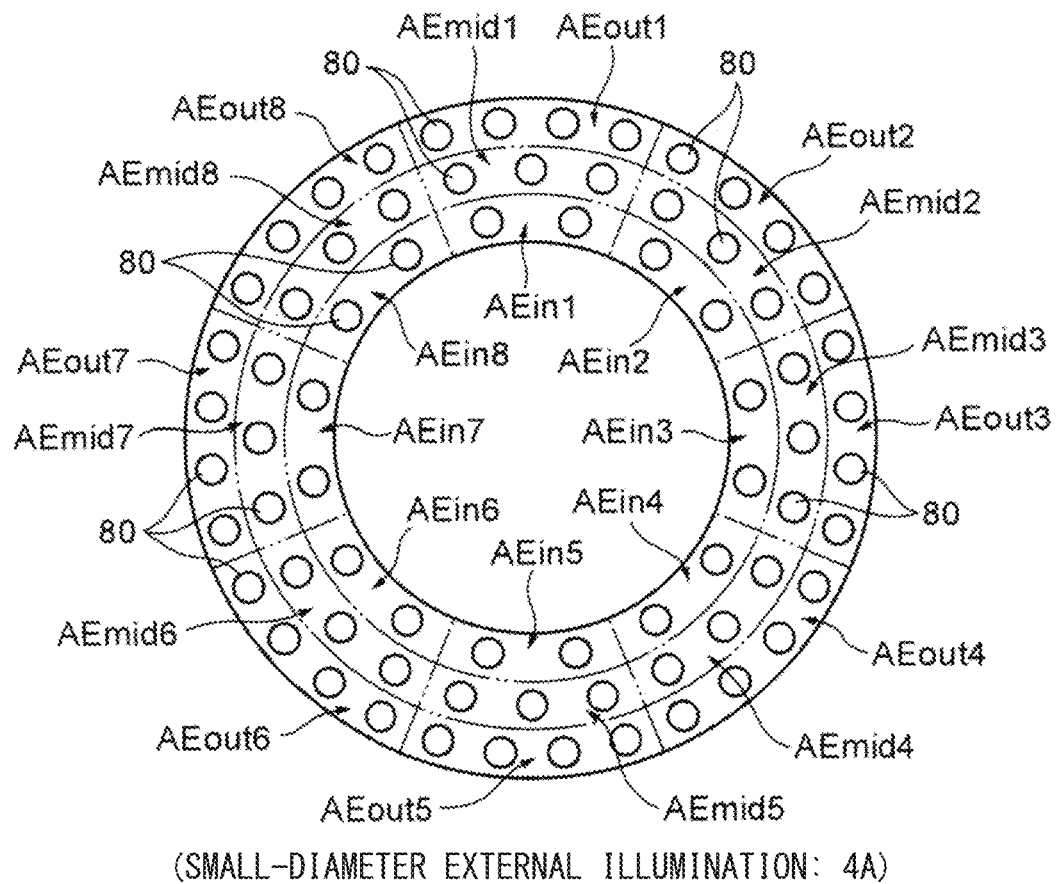
FIG. 34 is a front view of the dedicated external illumination unit having the small diameter, and is a view for describing that LEDs included in this external illumination unit are divided into a plurality of areas to control lighting on the area basis.

Partial Illumination of External Illumination Unit 4A Having Small Diameter (FIG. 34):

FIG. 34 is a plan view of the LED substrate 77 of the external illumination unit 4A having the small diameter. In the ring-shaped LED substrate 77, a large number of illumination LEDs 80 are arrayed almost uniformly in an entire circumference thereof. The illumination LEDs 80 are arranged at almost the same interval on three concentric circles at a distance from one another in a radial direction. More specifically, the plurality of illumination LEDs 80 are arrayed on the three concentric circles different in diameter centering on the optical axis of the lens assembly 36 of the bar code reader 2.

In the ring-shaped LED substrate 77, a row in an outermost circumference is divided into eight areas at an interval of 45°. These areas are illustrated as the outer circumference first area AEout 1 to the outer circumference eighth area AEout 8. An intermediate row is also divided into eight areas at an interval of 45°. These areas are illustrated as the outer intermediate first area AEmid 1 to the outer intermediate eighth area AEmid 8. A row in an inner circumference is also divided into eight areas at an interval of 45°. These areas are illustrated as the inner circumference first area AEin 1 to the inner circumference eighth area AEin 8. In the external illumination unit 4A having the small diameter, the partial illumination can also be set by dividing the entire area into a total of 24 areas. The lighting control by dividing the entire area into these areas may include the control of an amount of luminescence of the illumination LEDs 80. A color of the illumination by the illumination LEDs 80 may be varied, using each of the areas set for the partial illumination as a unit.

Figure 35:
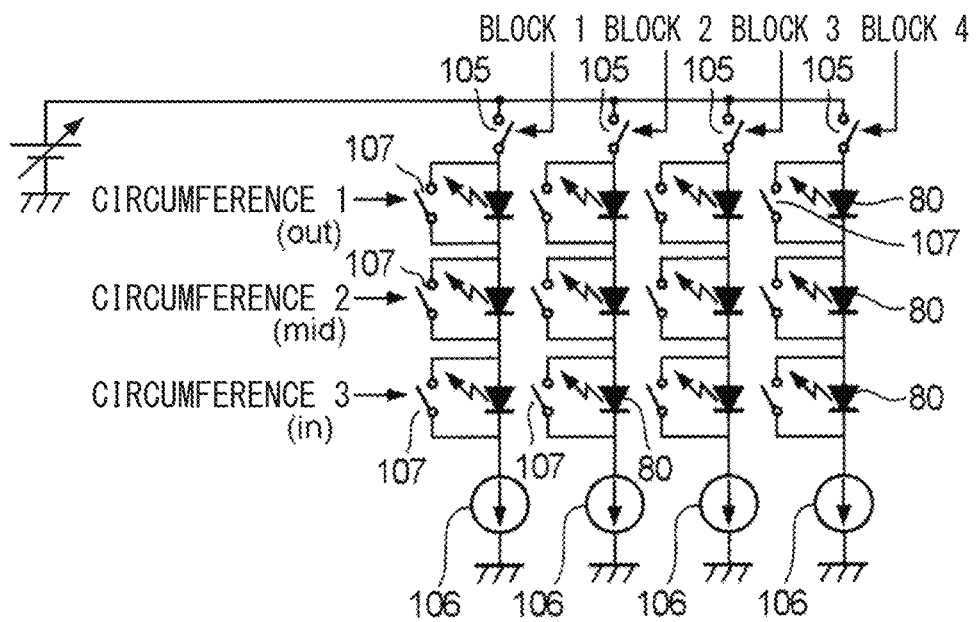
FIG. 35 is a diagram showing one example of an LED drive circuit each incorporated in the internal illumination unit and the external illumination unit

LED Drive Circuit of External Illumination Unit 4 (FIG. 35):

FIG. 35 shows a part of the LED drive circuit. The illustrated LED drive circuit can light the LEDs 80 on the area basis, and can supply a constant current to the plurality of illumination LEDs 80 belonging to each of the areas.

For example, with the small-diameter external illumination unit 4A in FIG. 34, the eight areas resulting from circumferentially dividing the ring-shaped LED substrate 77 at the interval of 45° are referred to as "blocks". For example, the outer circumference first area AEout 1, the intermediate first area AEmid 1, the inner circumferential first area AEin 1 make up a first block. In each of the blocks, a block switch 105 and a constant current circuit 106 are provided. Turning ON the block switch 105 brings a state where a voltage can be applied to the plurality of LEDs 80 belonging to the relevant block. For the plurality of LEDs 80 in each row, a row switch 107 to bypass the LEDs 80 is provided on the block basis, and a group of the illumination LEDs 80 connected parallel to each of the row switches 107 is connected in series. In FIG. 35, while only one of the illumination LEDs 80 is illustrated in each of the circumferential rows, this is only because the diagram is simplified, and it should be understood that a plurality of illumination LEDs 80 connected parallel to each of the row switches 107 are present in series.

The LEDs in each of the rows belonging to each of the blocks are connected in series, and in each of the rows, the row switch 107 is connected in parallel.

Accordingly, turning OFF the arbitrary row switch 107 allows the constant current to be supplied to the plurality of LEDs 80 belonging to the relevant block and the relevant row. The external illumination unit 4A includes this LED drive circuit, by which the area of the partial illumination can be arbitrarily set, using each of the rows in each of the blocks as a unit.

Moreover, by providing the constant current circuit 106 in each of the blocks, for example, a current flowing in the illumination LEDs 80 in the first to third circumferential rows in the same block can be maintained constant. In other words, without the constant current circuit 106, for example, if the illumination LEDs 80 in the first circumferential row are switched from OFF to ON when the illumination LEDs 80 in the second and third circumferential rows are lighted, the voltage applied to the illumination LEDs 80 in the second and third circumferential rows will change, thereby changing the current flowing the illumination LEDs 80 in the second and third rows, and thus changing brightness.

In other words, even when the block switch 105 is turned ON/OFF, the amount of luminescence of the illumination LEDs 80 belonging to the other blocks does not change. This is because the respective blocks are connected to the power source in parallel. However, when the row switch 107 is turned ON/OFF, the number of the LEDs 80 lighted in the relevant block changes, so that the brightness of the LEDs 80 changes with this.

When the lighting pattern of the partial illumination is set, fluctuation factors of the brightness of the LEDs 80 are desirably eliminated as much as possible in view of searching an optimal way to throw the light to the work. For this reason, the constant current circuit 106 is provided in each of the blocks. Thereby, when setting work of the lighting pattern is performed, it becomes easier to find the optimal lighting pattern by assuring uniformity and constancy of the luminance of the LEDs 80 in the lighted area to perform the partial illumination when the lighting pattern is changed. For the external illumination unit 4B having the large diameter, and the internal illumination unit 5, the LED drive circuit in FIG. 35 can be similarly employed.

Figure 36:
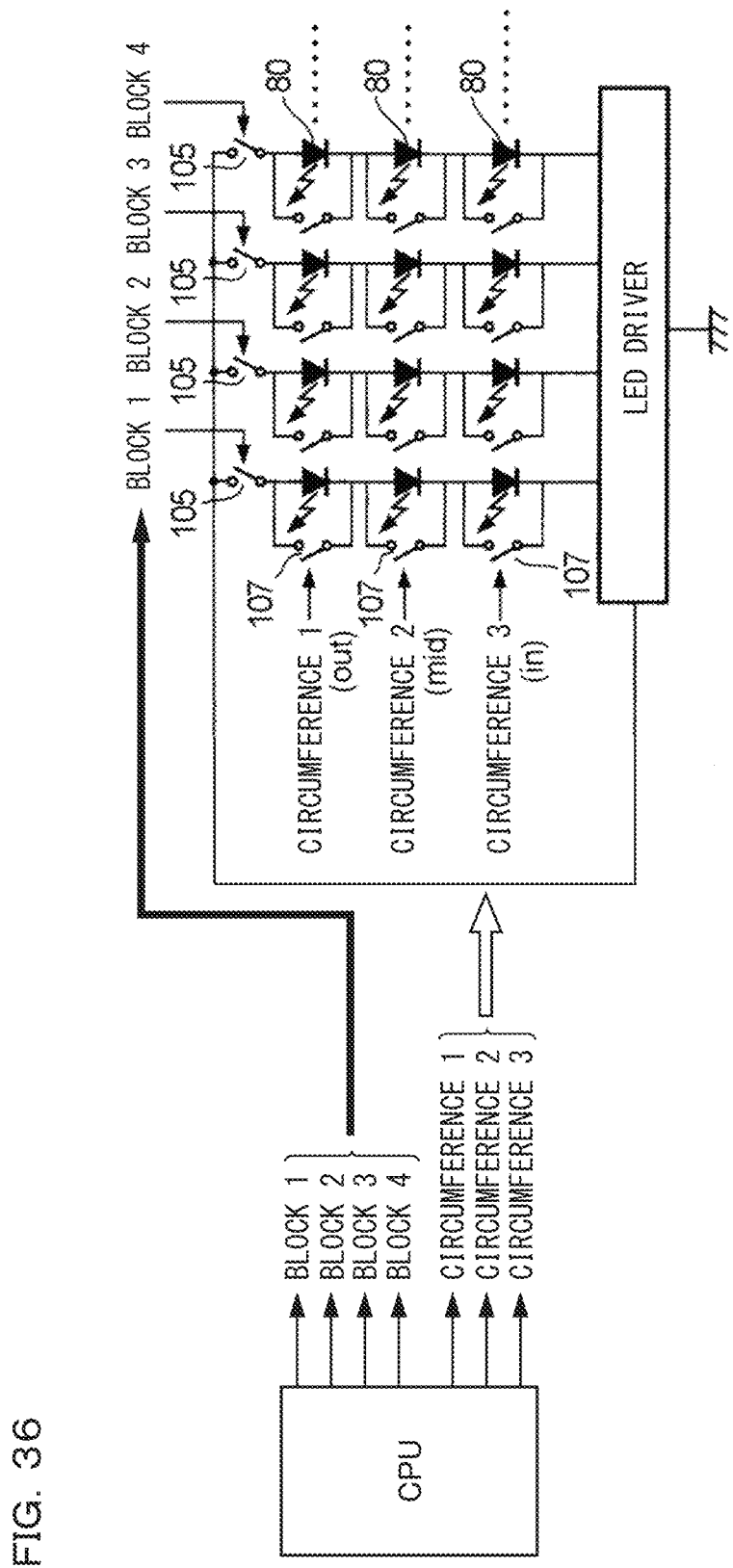
FIG. 36 is a system diagram for controlling partial illumination of the internal illumination unit and the external illumination unit.

Partial Illumination of Internal Illumination Unit 5 and External Illumination Unit 4 (FIG. 36):

The internal illumination unit 5 which is powered from the external illumination unit 4, and the external illumination unit 4 are both surface light sources, and these surface light sources can be each divided into several areas circumferentially and radially to perform partial illumination, using each of the areas as a unit, and the lighting pattern indicating which area is to be lighted and which area is not to be lighted can be arbitrarily set by the user. The lighting pattern including the lighting in all the areas can be registered by the user using the PC 3, and the lighting pattern set by the user is stored in the memory M of the bar code reader 2, and in the memory M of the external illumination unit 4 when the external illumination unit 4 is connected. This lighting control includes the control of the amount of luminescence of the illumination LEDs 80. In FIG. 36 as well, similarly to FIG. 35, while only one of the illumination LEDs 80 is illustrated in each of the circumferential rows, this is only because the diagram is simplified, and it should be understood that a plurality of illumination LEDs 80 connected parallel to each of the row switches 107 are present in series.

As described with reference to FIG. 1, the external illumination unit 4 includes a control unit of the CPU. Accordingly, as illustrated in FIG. 36, the respective block switches 105 and the row switches 107 in the respective circumferential rows are controlled by the CPU of the external illumination unit 4, so that when the circumferentially and radially divided partial illumination areas are set, the lighting control of the LEDs 80 is executed, using each of these areas as a unit.

Figure 37:
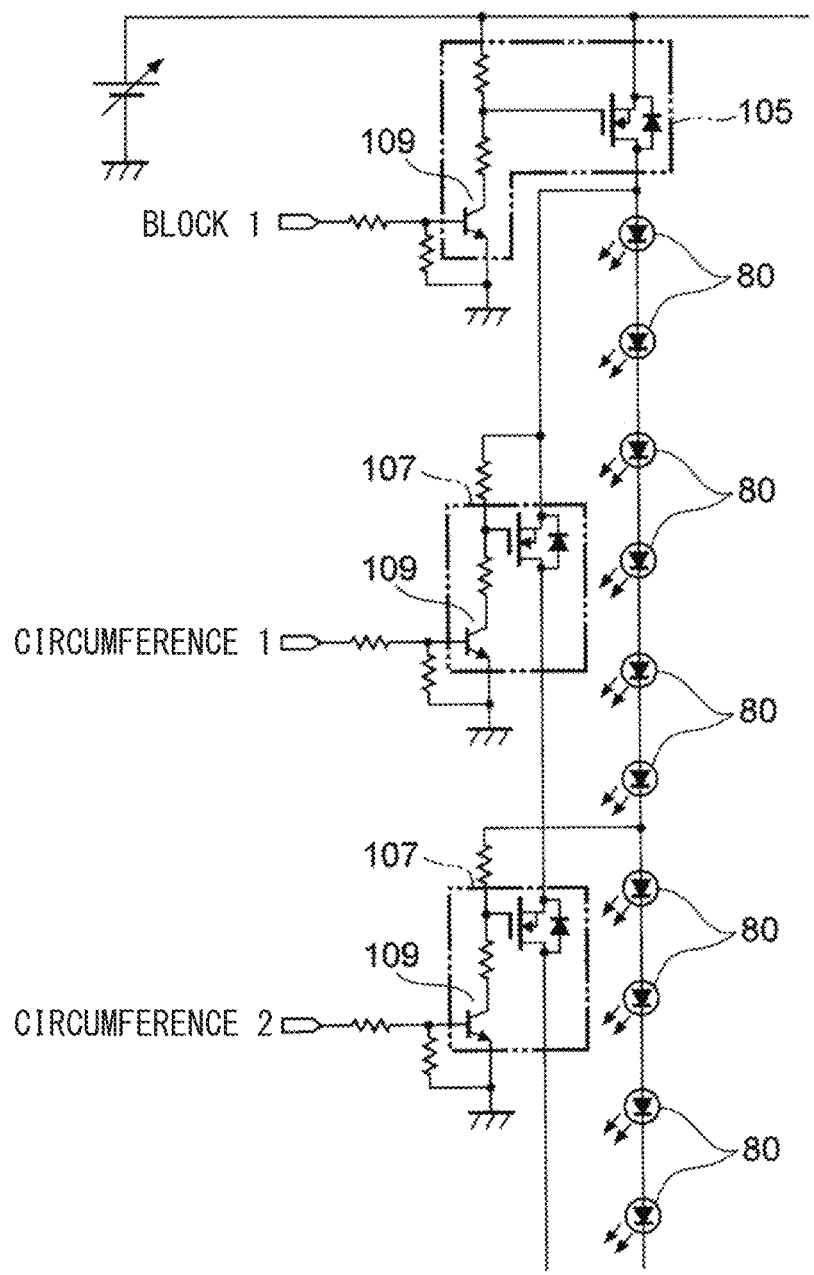
FIG. 37 is a diagram showing details of a switch mechanism of the LED drive circuit each incorporated in the internal illumination unit and the external illumination unit.

Details of Switch Mechanism (FIG. 37):

FIG. 37 shows details of the block switch 105 and the row switch 107 shown in FIGS. 35 and 36. As seen from FIG. 37, for the block switch 105 and the row switch 107, transistors 109 are employed as switch elements. In FIG. 37, although the illustration is omitted, it should be understood that the constant current circuit 106 is incorporated on the block basis in the LED drive circuit.

As a modification, a switch can also be provided in each of the plurality of illumination LEDs 80 belonging to each of the blocks, so that this switch can be controlled to thereby light the LEDs on the basis of the arbitrary area. As another modification, a current value of the constant current circuits 106 may be controlled. Specifically, in accordance with ON/OFF switchover of the row switches 107, the number of the lighted illumination LEDs 80 in each of the blocks changes. When the number of the lighted illumination LEDs 80 changes, the overall brightness of the external illumination unit 4 and the internal illumination unit 5 changes. In order to suppress this change in the brightness, the control is preferably performed so as to change the current value of the constant current circuits 106 in response to the ON/OFF of the row switches 107 so that the overall brightness of the external illumination unit 4 and the internal illumination unit 5 is even. For example, the control may be such that when the row switch 107 on the outer circumferential side is turned ON and the row switch 107 on the inner circumferential side is turned OFF to light out the illumination LEDs 80 on the inner circumferential side, the brightness of the illumination LEDs 80 on the outer circumferential side is increased by the original brightness of the lighted-out illumination LEDs 80 on the inner circumferential side.

As a further modification, in response to not only the ON/OFF switchover of the row switches 107 but also that of the block switches 105, the current value of the constant current circuits 106 may be changed. The control of the brightness of the LEDs 80 in response to the switchover of the block switches 105 may be controlled such that as the number of the lighted blocks becomes smaller, the brightness of the lighted LEDs 80 is increased, and on the contrary, as the number of the lighted blocks becomes larger, the brightness of the lighted LEDs 80 is decreased, by which the overall brightness of the external illumination unit 4 and the internal illumination unit 5 is made even. This control of the brightness of the lighted LEDs 80 is enabled by changing the current value of the constant current circuits 106, as described above.

Here, it should be noted that in the circuit illustrated in FIGS. 35 and 36 of the embodiment, the same constant current circuits 106 are provided in the respective block circuits, and that the control is performed so that the value of the current flowing in each of the blocks becomes a predetermined current value. According to this circuit, local light and dark, that is, a situation where the LEDs 80 in one of the areas are light and the LEDs 80 in the other area are relatively dark does not occur. In addition to this, when the control is performed to vary the brightness in accordance with the number of rows to be lighted or the number of blocks to be lighted, the brightness of all the lighted LEDs 80 is simultaneously changed by the constant current circuits 106, and thus, the brightness in the respective areas is the same.

Lighting Control Areas of the External Illumination Unit 4 and the Internal Illumination Unit 5 (FIGS. 38 and 39):

As described above, the external illumination unit 4 and the internal illumination unit 5 are capable of the partial lighting.

Figure 38:
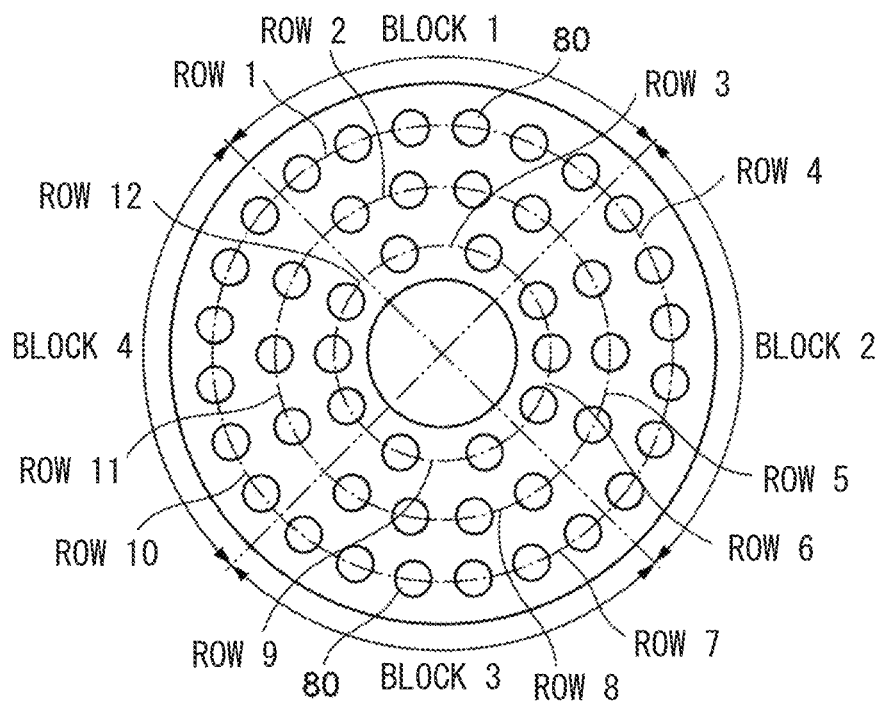
FIG. 38 is a view for describing a concept of a "block" and a "row" relating to the LED drive of the internal illumination and the external illumination.
Figure 39:
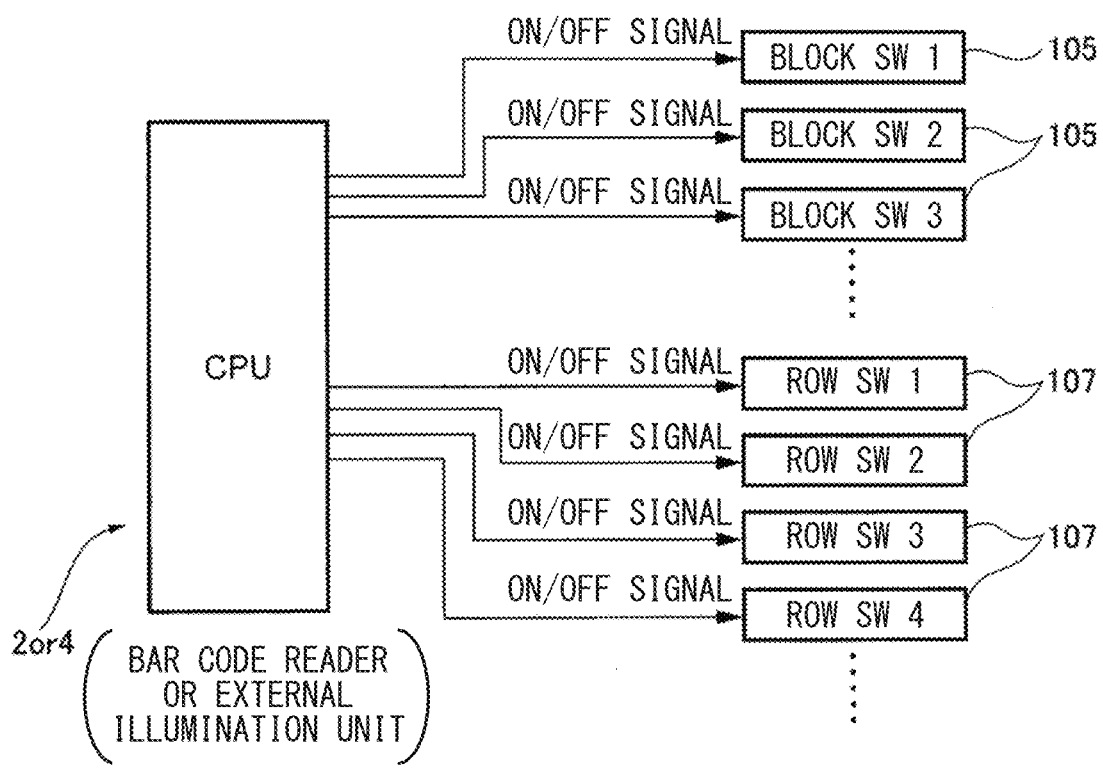
FIG. 39 is an overall system diagram relating to the lighting control of setting areas for the partial illumination of the internal illumination unit and the external illumination unit.

Referring to FIGS. 38 and 39, the block switches 105 and the row switches 107 will be described in detail. As seen from FIG. 38, the term "block" means the region resulting from circumferentially dividing the ring-shaped surface light source. Next, the term "row" means the illumination LEDs 80 belonging to the common concentric circuit among the illumination LEDs 80 belonging to each of the blocks. Accordingly, referring to FIG. 38, a first row of a first block means a group of the illumination LEDs 80 located in the outermost row among the plurality of illumination LEDs 80 belonging to "block 1".

As described above, the power supply to the plurality of illumination LEDs 80 belonging to each of the blocks is first controlled by the block switch 105. On this assumption, the power supply to the plurality of illumination LEDs 80 belonging to each of the rows is controlled by the row switch 107. Accordingly, the lighting of the LEDs 80 in the first row of the first block can be realized by turning ON the row switch 107 in the first row on the assumption that the block switch 105 of the first block is turned ON.

With regard to the "row", for example, "row 2" and "row 3" illustrated in FIG. 38 may be treated as one row. That is, the plurality of rows belonging to the same block may be treated as one row.

In the partial lighting control described above, for example, setting of the second row and the third row of the first block as one partial lighting area can be realized by turning ON both of the two row switches 107 in the second row and the third row, on the assumption that the block switch 105 of the first block is turned ON. Accordingly, as described above, the switches 105, 107 are provided in each of the blocks divided circumferentially, and in each of the rows belonging to each of the blocks, and the combinations of these enables the partial lighting areas of the external illumination unit 4 and the internal illumination unit 5 to be freely set.

Moreover, as described above, in the drive circuit of the illumination LEDs 80, the constant current circuit 106 is incorporated in each of the blocks (FIG. 35), and preferably, the constant current circuit 106 is further incorporated in each of the rows (FIG. 36). These constant current circuits 106 enable the luminance of the surface light source created in each of the areas to be kept uniform in the whole of each of the areas.

Illumination Control of External Illumination Unit 4 (FIG. 1):

The model information of the external illumination unit 4 is stored in the memory M of the external illumination unit 4 and the memory M of the bar code reader 2. Moreover, one or more lighting patterns set using the personal computer 3 are stored in the memories M of the bar code reader 2 and the external illumination unit 4, respectively. Both of the bar code reader 2 and the external illumination unit 4 have the CPUs (processors), and the mutual communication is enabled.

The CPU of the bar code reader 2 determines whether or not the external illumination unit 4 is a dedicated one capable of communication with the bar code reader 2, based on a connection wiring state between the bar code reader 2 and the external illumination unit 4. Here, the connection wiring state refers to, for example, pin arrangement of connection wiring and the like.

When it is determined that the external illumination unit 4 is communicable, the personal computer 3 acquires the illumination type information (model information) stored in the memory M of the external illumination unit 4. After the model information stored in a memory M of the personal computer 3 is acquired, the setting program installed in the personal computer 3 causes a setting screen for setting the partial illumination lighting pattern corresponding to the acquired type of the model to be displayed on a display of the personal computer 3. This allows the user to immediately and easily grasp which lighting pattern can be set for the external illumination unit 4 currently connected.

Figure 40:
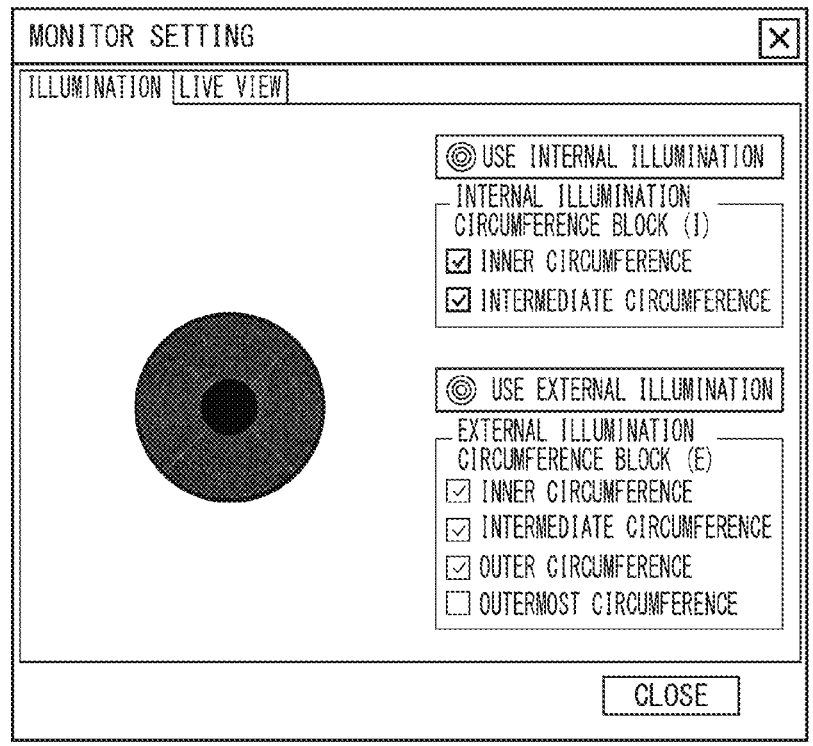
FIG. 40 is a view showing one example of a setting screen for setting a lighting pattern, using a personal computer, and showing a display aspect of the setting screen when the external illumination unit is absent, wherein the lighting pattern of lighting all the plurality of LEDs included in the internal illumination unit incorporated in the bar code reader is selected.
Figure 41:
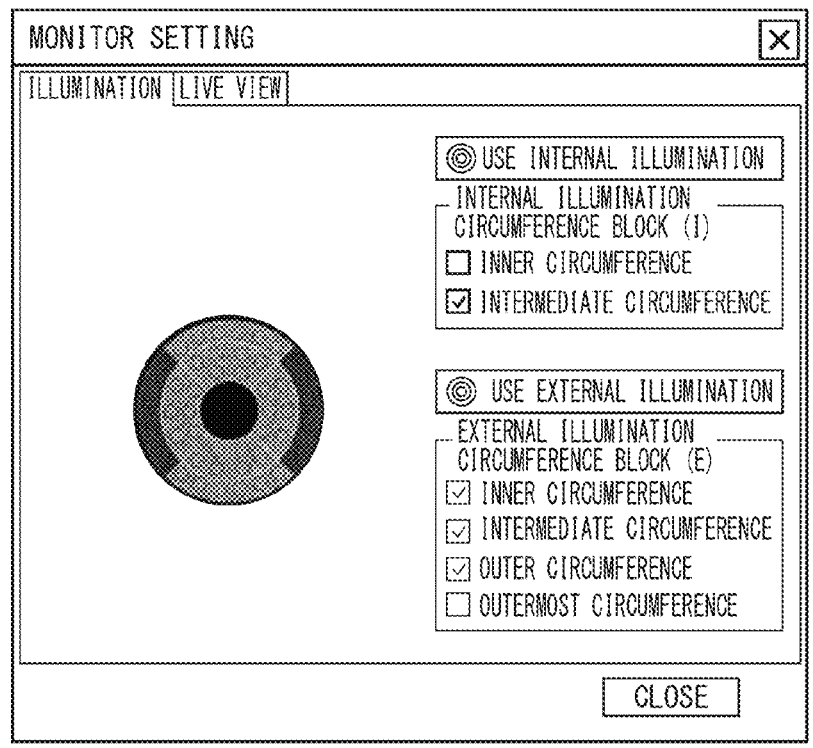
FIG. 41 is a view showing one example of the setting screen for setting the lighting pattern, using the personal computer, and showing a display aspect of the setting screen when the external illumination unit is absent as in FIG. 40, wherein the lighting pattern of lighting the two opposed areas located on an outer circumferential side among the plurality of LEDs included in the internal illumination unit incorporated in the bar code reader is selected.

The illumination setting screens in FIGS. 40 to 43, which have been prepared in a lighting area setting program in advance, are displayed on the display of the personal computer (PC) 3. In the illumination setting screen in FIG. 40, the following settings are enabled, using a mouse connected to the PC 3. Referring to FIG. 40, the illumination setting screen includes a ring-shaped image that schematically illustrates the illumination unit, and when a setting item is selected in this screen, the ring-shaped image changes so as to be able to intuitively grasp this lighting pattern.

Items that can be set in the illumination setting screen in FIG. 40 are as follows.

(1) The illumination by the internal illumination unit 5 and the illumination by the external illumination unit 4 can be selected alternately. When the dedicated external illumination unit 4 is not connected to the bar code reader 2, as can be seen from the setting screen in FIG. 40, an item of "use the external illumination" is displayed in gray, so this item cannot be selected.

(2) As the lighting areas of the internal illumination unit 5, an "inner circumference" pattern and an "intermediate circumference" pattern can be selected (FIG. 40). The selection between the "inner circumference" and the "intermediate circumference" may be alternative, or the two patterns of the "inner circumference" and the "intermediate circumference" can be selected. The "inner circumference" means the pattern of lighting the inner circumference first area AEin 1 to the inner circumference fourth area AEin 4 in FIG. 32. Selecting only the "inner circumference" means the pattern of lighting the outer circumference second area AEout 2 and the outer circumference fourth area AEout 4 in FIG. 32. Selecting both the "inner circumference" and the "inner circumference" means the pattern of lighting the whole area.

Referring to FIG. 40, check marks are placed on both the "inner circumference" and the "inner circumference", which shows a state where the user has selected both the lighting patterns of the "inner circumference" and the "inner circumference", and the whole area of the ring-shaped image is displayed in red. On the other hand, referring to FIG. 41, a check mark is placed on the "inner circumference", which shows a state where the user has selected only the "inner circumference" pattern, and only the outer second area AEout 2 and the outer circumference fourth area AEout 4 of the ring-shaped image are displayed in red, while the other areas are displayed in gray, which means that they are unselected.

Figure 42:
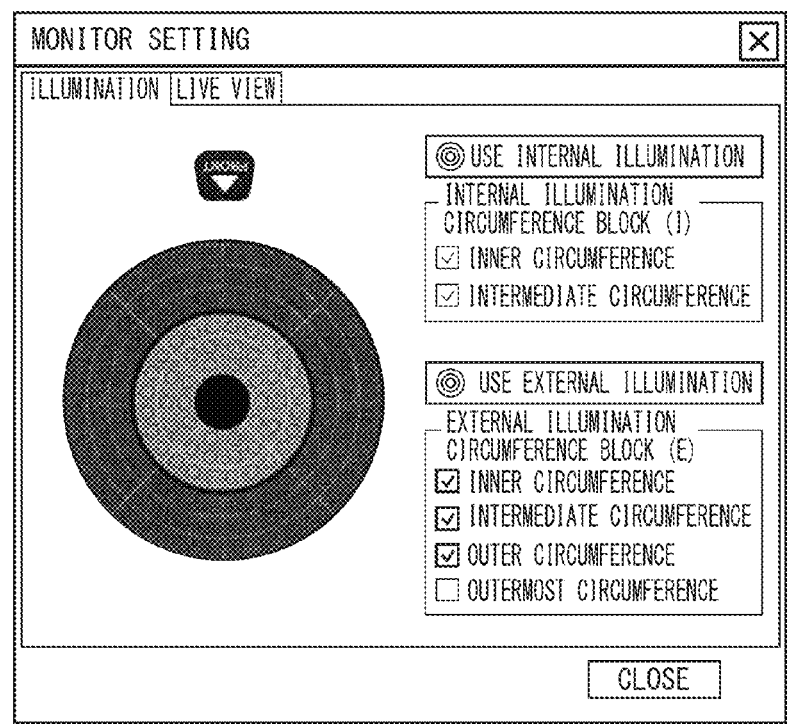
FIG. 42 is a view showing one example of the setting screen for setting the lighting pattern, using the personal computer, and showing a display aspect of the setting screen when the external illumination unit having the small diameter is connected to the bar code reader, wherein the lighting pattern of lighting all the plurality of LEDs included in the external illumination unit having the small diameter is selected.
Figure 43:
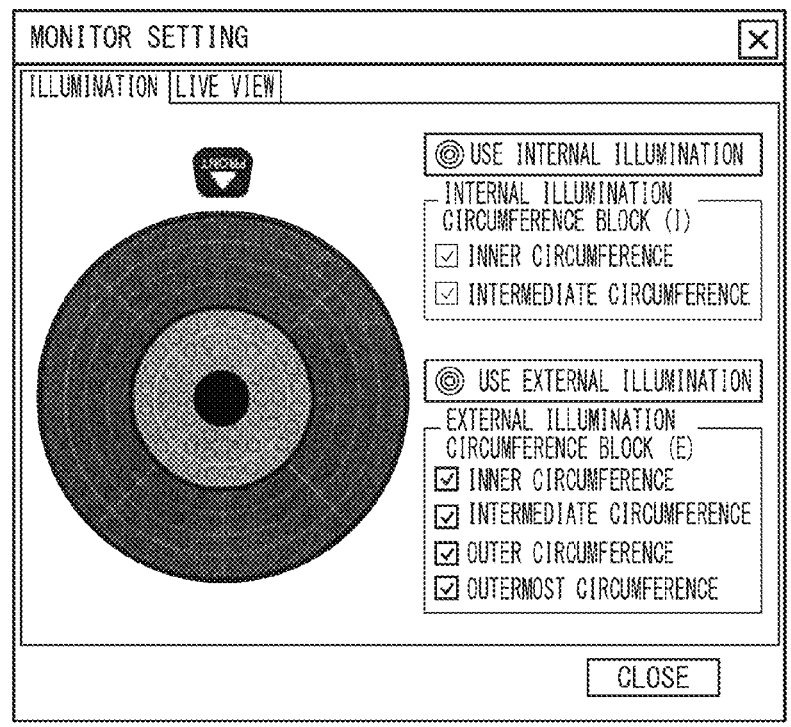
FIG. 43 is a view showing one example of the setting screen for setting the lighting pattern, using the personal computer, and showing a display aspect of the setting screen when the external illumination unit having the large diameter is connected to the bar code reader, wherein the lighting pattern of lighting all the plurality of LEDs included in the external illumination unit having the large diameter is selected.

(3) For selection items of the external illumination unit 4, the setting screen in FIG. 42 is displayed when the external illumination unit 4A having the small diameter (FIG. 34) is connected. On the other hand, the setting screen in FIG. 43 is displayed when the external illumination unit 4B having the large diameter (FIG. 33) is connected. When FIG. 42 (the setting screen of the small-diameter unit 4A) and FIG. 43 (the setting screen of the large-diameter unit 4B) are compared, in the setting screen of the external illumination unit 4A having the small diameter (FIG. 42), three patterns of an "inner circumference", an "intermediate circumference" and an "outer circumference" can be selected, and an "outermost circumference" is displayed in gray, which means that it is in a non-selectable state. In the external illumination unit 4A having the small diameter, at least one pattern can be selected from the "inner circumference", the "intermediate circumference" and the "outer circumference". In contrast, in the setting screen of the external illumination unit 4B having the large diameter (FIG. 43), four patterns of the "inner circumference", the "intermediate circumference", the "outer circumference", and the "outermost circumference" can be selected. In the external illumination unit 4B having the large diameter, at least one pattern can be selected from the "inner circumference", the "intermediate circumference", the "outer circumference", and the "outermost circumference".

When the "inner circumference" pattern is selected, all the eight areas of the first area AEin 1 to the eighth area AEin 8 in the innermost circumference described in the FIGS. 33 and 34 are lighted. When the "intermediate circumference" pattern is selected, in the small-diameter unit 4A, all the eight areas of AEmid 1 to AEmid 8 are lighted (FIG. 34), and in the large-diameter unit 4B, all the eight areas of AEmid 9 to AEmid 18 are lighted (FIG. 33). When the "outer circumference" pattern is selected, in the small-diameter unit 4A, all the eight areas of AEout 1 to AEout 8 are lighted (FIG. 34), and in the large-diameter unit 4B, all the eight areas of the AEmid 1 to AEmid 8 are lighted (FIG. 33). In the large-diameter unit 4B, when the "outermost circumference" is selected, all the eight areas of AEout 1 to AEout 8 in the outermost row are lighted (FIG. 33).

The setting screen in FIG. 42 is in a state where the selection to light all the areas of the external illumination unit 4A having the small diameter is performed. The setting screen in FIG. 43 is in a state where the selection to light all the areas of the external illumination unit 4B having the large diameter is performed.

When "close" provided in each of the setting screens in FIGS. 40 to 43 is selected, the setting of the lighting pattern ends, and setting information of this lighting pattern is transferred to the bar code reader 2, and is transferred to the external illumination unit 4. The setting information is stored in the memories M (FIG. 1) of the bar code reader 2 and the external illumination unit 4.

As described above, the external illumination unit 4, storing its own illumination model information in the memory M, can set the lighting pattern in accordance with the model of the external illumination unit 4 by the lighting pattern setting program of the personal computer 3.

Upon receiving a signal of a lighting command from the bar code reader 2, the external illumination unit 4 controls the lighting of the illumination LEDs 80 of the external illumination unit 4, based on the setting information of the lighting pattern stored in the memory M of the external illumination unit 4. This control is executed by the CPU of the external illumination unit 4.

Obviously, the setting screens in FIGS. 40 to 43 are only examples. As described above with reference to FIG. 33 (the large-diameter illumination unit 4B) and FIG. 34 (the small-diameter illumination unit 4A), a display aspect of the setting screens can also be designed so as to be able to set the lighting and non-lighting for each of the divided areas. The user may be enabled to arbitrarily modify these setting screens.

Moreover, the user may register several lighting patterns in advance and be enabled to make setting, based on the plurality of registered patterns. Moreover, the user may set the plurality of lighting patterns, and switch the lighting patterns of the external illumination unit 4, based on a signal from the bar coder reader 2.

In the external illumination unit 4, when the command from the bar code reader 2 is received, the control of the illumination LEDs 80 is executed by the CPU of the external illumination unit 4, and referring to the lighting pattern specified by the bar code reader 2 in the memory M of the external illumination unit 4, the partial illumination of the external illumination unit 4 is performed.

In this manner, the external illumination unit 4 with the CPU incorporated therein stores one or more lighting patterns registered in advance in the memory M provided in the external illumination unit 4, which allows the external illumination unit 4 to execute the one or more lighting patterns only by supplying the lighting command signal from the bar code reader 2 to the external illumination unit 4. Obviously, this control of the lighting pattern also includes the control of the amount of luminescence of the LEDs 80.

Figure 44:
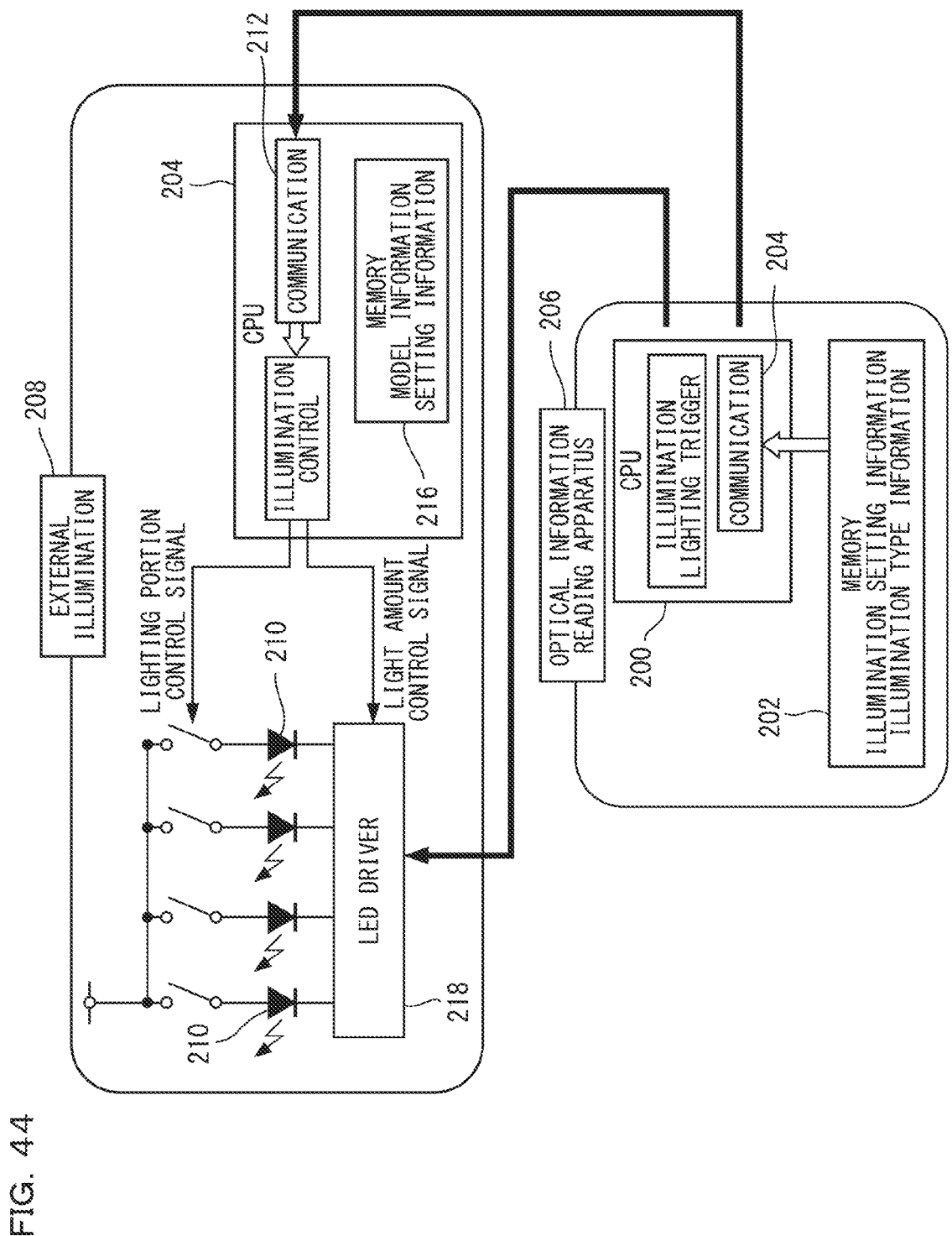
FIG. 44 is a conceptual configuration diagram of a typical specific example of the present invention.

While the bar code reader system 1 of the embodiment has been described above in detail, referring to FIG. 44, the conceptual configuration of the present invention described above will be simply described as follows. Referring again to FIG. 44, the setting information of the illumination lighting pattern (including the partial lighting and overall lighting) set by the personal computer 3 (FIG. 1) is first stored in a memory 202 of an optical information reading apparatus 206. This information is transferred from the optical information reading apparatus 206 to an external illumination unit 208 to be stored in a memory 216 of the external illumination unit 208.

A CPU 214 of the external illumination unit 208 performs the control the lighting portion and the amount of light in accordance with communications 204, 212 with a CPU 200 of the optical information reading apparatus 206, based on the setting information stored in the memory 216 of the external illumination unit 208. The control of the lighting portion is executed by controlling ON/OFF of the foregoing block switches 105 and the row switches 107 (FIGS. 35 and 36). Moreover, the light amount control is executed by controlling an amount of the current of the foregoing constant current circuits 106 (FIG. 35).

Thereafter, an LED driver 218 of the external illumination unit 208 receives an illumination lighting trigger from the optical information reading apparatus 206, and the ON/OFF switchover of illumination LEDs 210 is performed.

As can be understood from the above description, storing the setting information of the lighting pattern in the memory 216 of the external illumination unit 208 enables the complicated lighting pattern of the external illumination unit 208 to be executed only with a simple trigger signal. While in the above embodiment, the external illumination unit 208 includes the CPU 214, the above-described control of the lighting pattern of the illumination or the like may be executed in a digital circuit, instead of the CPU 214.

When the user wants to change the lighting pattern, the user may create arbitrary lighting pattern information, using the illumination setting program of the personal computer 3 (FIG. 1), and may similarly cause the lighting pattern information to be stored in the memory 216 of the external illumination unit 208. By causing the setting of the lighting pattern to be included in a setting bank, the control of automatic switchover of this setting bank may be added. The setting bank is a file collectively storing various parameters of the optical information reading system, and by preparing the plurality of setting banks in advance, reading can be executed while automatically switching to the other setting bank, for example, when the reading does not succeed. In the case where the reading by the automatic switchover of these setting banks is performed, the setting information of the lighting pattern included in each of the setting banks is transferred to the external illumination unit 208 at timing when the setting bank is switched, and causes the setting information to be stored in the memory 216 of the external illumination unit 208, by which the illumination in the lighting patterns corresponding to each of the setting banks is enabled.

Thus, the present invention is applied to the illumination when the optical information such as the bar code and the QR code is read.

What is claimed is:

1. An optical information reading device comprising:
   an internal illumination unit configured with a plurality of illumination LEDs;
   an image sensor that acquires an image;
   a switching device that switches lighting of the internal illumination unit on or off for each area resulting from dividing the plurality of illumination LEDs into a predetermined plurality of areas;
   a memory storing a lighting pattern defining the area to be lighted;
   a connecting portion configured to connect an external illumination unit with the optical information reading device;
   a control device that controls the switching device so as to light the illumination LEDs in the area corresponding to the lighting pattern with reference to the lighting pattern and selects the internal illumination unit and the external illumination unit to be used.

2. The optical information reading device according to claim 1, wherein
   the internal illumination unit is made of a ring-shaped illumination unit, and
   the plurality of areas are created by dividing a whole area in a circumferential direction and in a radial direction of the ring-type internal illumination unit.

3. The optical information reading device according to claim 1, wherein
   the control device further controls the amount of luminescence of the plurality of LEDs of the internal illumination unit and the external illumination unit individually.

4. The optical information reading device according to claim 1, further comprising:
   constant current circuits that supplies a constant current to the plurality of illumination LEDs belonging to the respective area.

5. The optical information reading device according to claim 1, wherein
   the external illumination unit is made of a ring-shaped illumination unit, and has a circular outline, and has a circular opening in its center.

6. The optical information reading device according to claim 5, further comprising:
   a stand that positions the external illumination unit to the optical information reading device so that the center of the circular opening matches the optical axis of the optical information reading device, wherein
   the stand has a slit that allows a height position of the optical information reading device to be adjusted.

7. An optical information reading system comprising:
   an internal illumination unit configured with a plurality of illumination LEDs;
   an image sensor that acquires an image;
   a switching device that switches lighting of the internal illumination unit on or off for each area resulting from dividing the plurality of illumination LEDs into a predetermined plurality of areas;
   a memory storing a lighting pattern defining the area to be lighted;
   an external illumination unit configured with a plurality of illumination LEDs;
   a connecting portion configured to connect the external illumination unit with the optical information reading device;

a control device that controls the switching device so as to light the illumination LEDs in the area corresponding to the lighting pattern with reference to the lighting pattern and selects the internal illumination unit and the external illumination unit to be used.

8. An optical information reading system comprising an optical information reading device and an external illumination unit, said optical information reading device comprising:

an internal illumination unit configured with a plurality of illumination LEDs;

an image sensor that acquires an image;

a switching device that switches lighting of the internal illumination unit on or off for each area resulting from dividing the plurality of illumination LEDs into a predetermined plurality of areas;

a memory storing a lighting pattern defining the area to be lighted;

a connecting portion configured to connect an external illumination unit with the optical information reading device;

a control device that controls the switching device so as to light the illumination LEDs in the area corresponding to the lighting pattern with reference to the lighting pattern and selects the internal illumination unit and the external illumination unit to be used, and wherein said optical information device is connected to said external illumination unit.

\* \* \* \* \*